United States Patent
Zhu et al.

(10) Patent No.: US 9,622,064 B2
(45) Date of Patent: Apr. 11, 2017

(54) POWER CONTROL OF NEIGHBOR DISCOVERY SIGNALS

(71) Applicant: FUJITSU LIMITED, Kawasaki-shi, Kanagawa (JP)

(72) Inventors: Chenxi Zhu, Fairfax, VA (US); Dorin Viorel, Calgary (CA); Huy Dung Han, Santa Clara, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 85 days.

(21) Appl. No.: 13/828,617

(22) Filed: Mar. 14, 2013

(65) Prior Publication Data

US 2014/0274192 A1    Sep. 18, 2014

(51) Int. Cl.

| | |
|---|---|
| *H04B 7/00* | (2006.01) |
| *H04W 8/00* | (2009.01) |
| *H04W 52/38* | (2009.01) |
| *H04W 52/36* | (2009.01) |
| *H04W 92/18* | (2009.01) |

(Continued)

(52) U.S. Cl.
CPC ......... *H04W 8/005* (2013.01); *H04W 52/367* (2013.01); *H04W 52/383* (2013.01); *H04W 52/16* (2013.01); *H04W 52/242* (2013.01); *H04W 52/244* (2013.01); *H04W 52/325* (2013.01); *H04W 72/042* (2013.01); *H04W 72/0446* (2013.01); *H04W 72/0453* (2013.01); *H04W 72/0473* (2013.01);

(Continued)

(58) Field of Classification Search
CPC ..... H04W 8/005; H04W 84/18; H04W 4/023; H04W 40/246; H04W 76/023; H04W 4/025; H04W 4/008; H04W 64/00; H04W 88/04; H04W 52/367; H04W 52/383; H04W 4/005
USPC ................................ 455/13.1, 11.1, 522, 69
See application file for complete search history.

(56) References Cited

U.S. PATENT DOCUMENTS

2003/0203742 A1    10/2003  D'Souza et al.
2006/0084379 A1*   4/2006  O'Neill ........................... 455/25

(Continued)

FOREIGN PATENT DOCUMENTS

JP    2008-306293 A    12/2008
RU        2454018 C2     6/2012

(Continued)

OTHER PUBLICATIONS

International Search Report dated Aug. 12, 2014 in application No. PCT/US2014/028719.
RP-122009, Study on LTE Device to Device Proximity Services, 3GPP TSG RAN #58, Dec. 4-7, 2012, Barcelona, Spain.
RP-121699, Qualcomm Inc., Background on "LTE D2D Proximity Services" Study Item proposal, 3GPP TSG RAN #58, Dec. 4-7, 2012, Barcelona, Spain.

(Continued)

*Primary Examiner* — Tu X Nguyen
(74) *Attorney, Agent, or Firm* — Maschoff Brennan

(57) ABSTRACT

A method of adjusting power of a neighbor discovery signal may include determining a maximum transmission power of a transmitting wireless device. The transmitting wireless device may be configured to transmit a neighbor discovery signal to one or more receiving wireless devices. The one or more receiving wireless devices may be discovered neighbor wireless devices of the transmitting wireless device and may be configured to receive the neighbor discovery signal. The method may further include determining a power level of the neighbor discovery signal based on the maximum transmission power of the transmitting wireless device and a number of the discovered neighbor wireless devices.

17 Claims, 9 Drawing Sheets

(51) Int. Cl.

| | |
|---|---|
| *H04W 52/32* | (2009.01) |
| *H04W 52/16* | (2009.01) |
| *H04W 52/24* | (2009.01) |
| *H04W 72/04* | (2009.01) |
| *H04W 72/08* | (2009.01) |
| *H04W 72/12* | (2009.01) |
| *H04W 76/02* | (2009.01) |

(52) U.S. Cl.
 CPC ........ *H04W 72/082* (2013.01); *H04W 72/121* (2013.01); *H04W 76/023* (2013.01); *H04W 92/18* (2013.01)

(56) References Cited

U.S. PATENT DOCUMENTS

| | | | |
|---|---|---|---|
| 2011/0205887 A1* | 8/2011 | Wu et al. ................... | 370/229 |
| 2011/0319120 A1 | 12/2011 | Chen et al. | |
| 2012/0028672 A1 | 2/2012 | Chen et al. | |
| 2012/0269072 A1 | 10/2012 | Wu et al. | |
| 2014/0003262 A1* | 1/2014 | He et al. ................... | 370/252 |
| 2016/0007304 A1 | 1/2016 | Morita | |

FOREIGN PATENT DOCUMENTS

| | | |
|---|---|---|
| WO | 2008/019140 A2 | 2/2008 |
| WO | 2014/129450 A1 | 8/2014 |

OTHER PUBLICATIONS

3rd Generation Partnership Project;Technical Specification Group Radio Access Network; Evolved Universal Terrestrial Radio Access (E-UTRA); Physical channels and modulation (Release 10), TS.36.211-a10, Dec. 2011.
3rd Generation Partnership Project;Technical Specification Group Radio Access Network; Evolved Universal Terrestrial Radio Access (E-UTRA); Multiplexing and channel coding (Release 10), TS.36.212-a10, Dec. 2011.
3rd Generation Partnership Project;Technical Specification Group Radio Access Network; Evolved Universal Terrestrial Radio Access (E-UTRA); Physical layer procedures (Release 10), TS.36.213-a10, Dec. 2011.
Mexican Office Action for corresponding application No. MX/a/2015/011222, mailed Jun. 17, 2016.
Canadian Office Action for corresponding application No. 2,897,216, mailed Jun. 1, 2016.
ZTE: Evaluation methodology for D2D discovery, 3GPP Draft, R1-130133 Evalmet D2D Discovery, 3rd Generation Partnership Project (3GPP), retrieved Jan. 19, 2013.
European Search Report for corresponding application No. EP 14 76 8649, mailed Sep. 16, 2016.
Russian Office Action and Search Report for corresponding Russian application No. 2015136452/07, mailed Apr. 14, 2016.
Japanese Office Action for corresponding application No. 2016-502879, mailed Oct. 25, 2016.

* cited by examiner

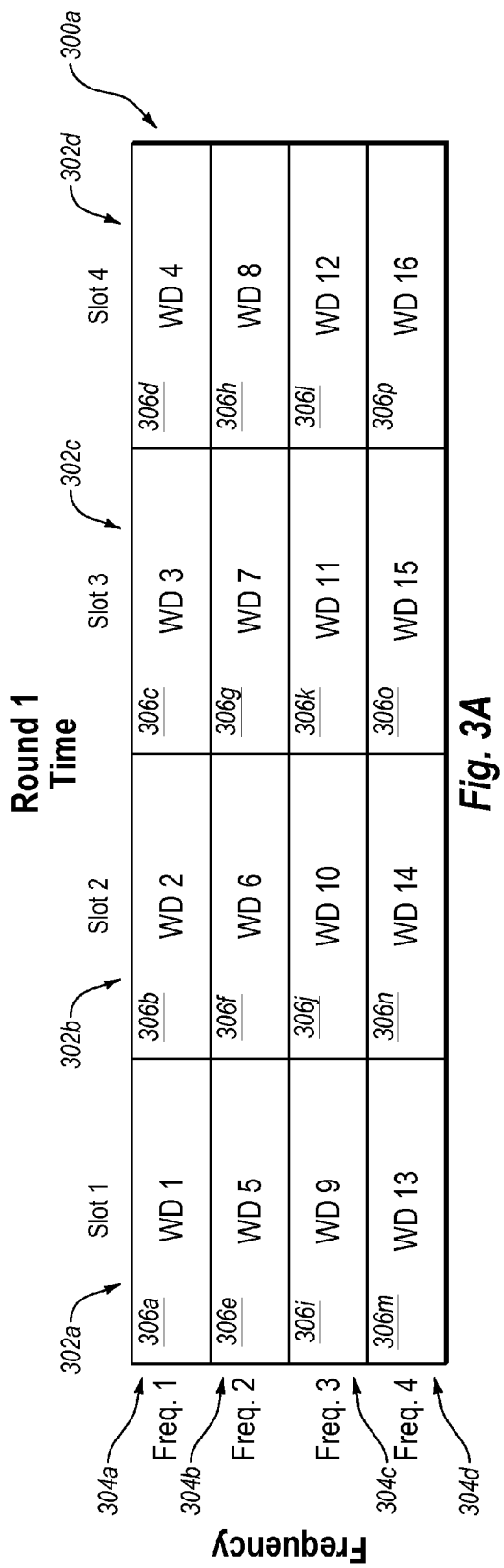
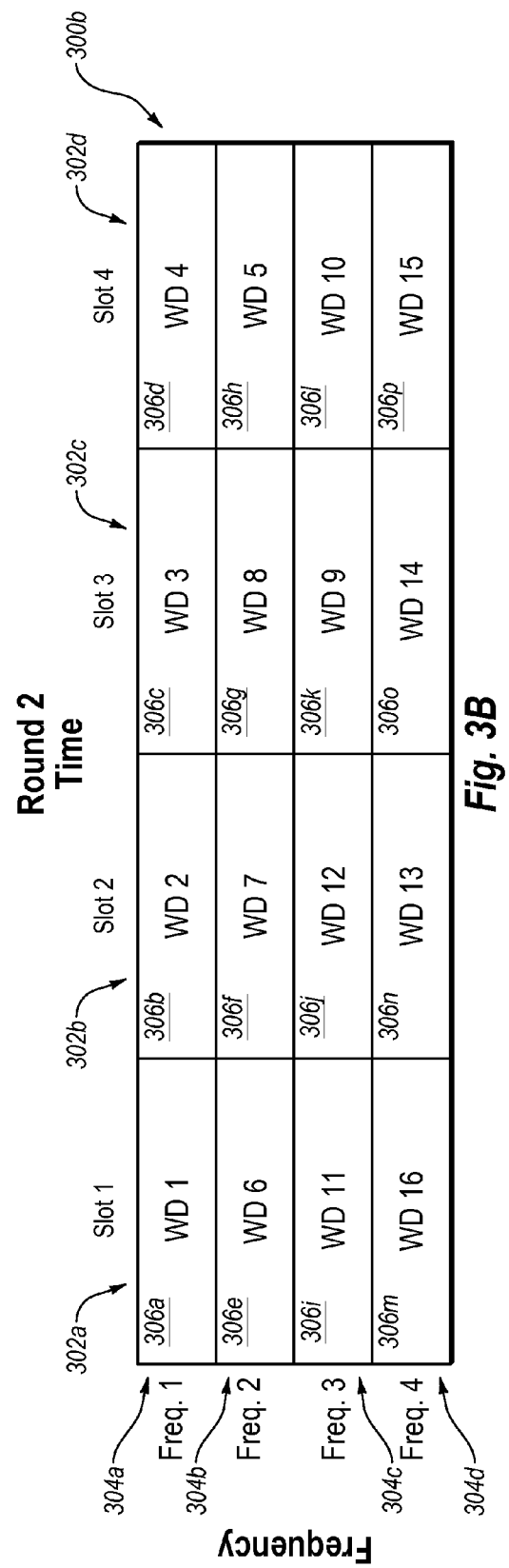

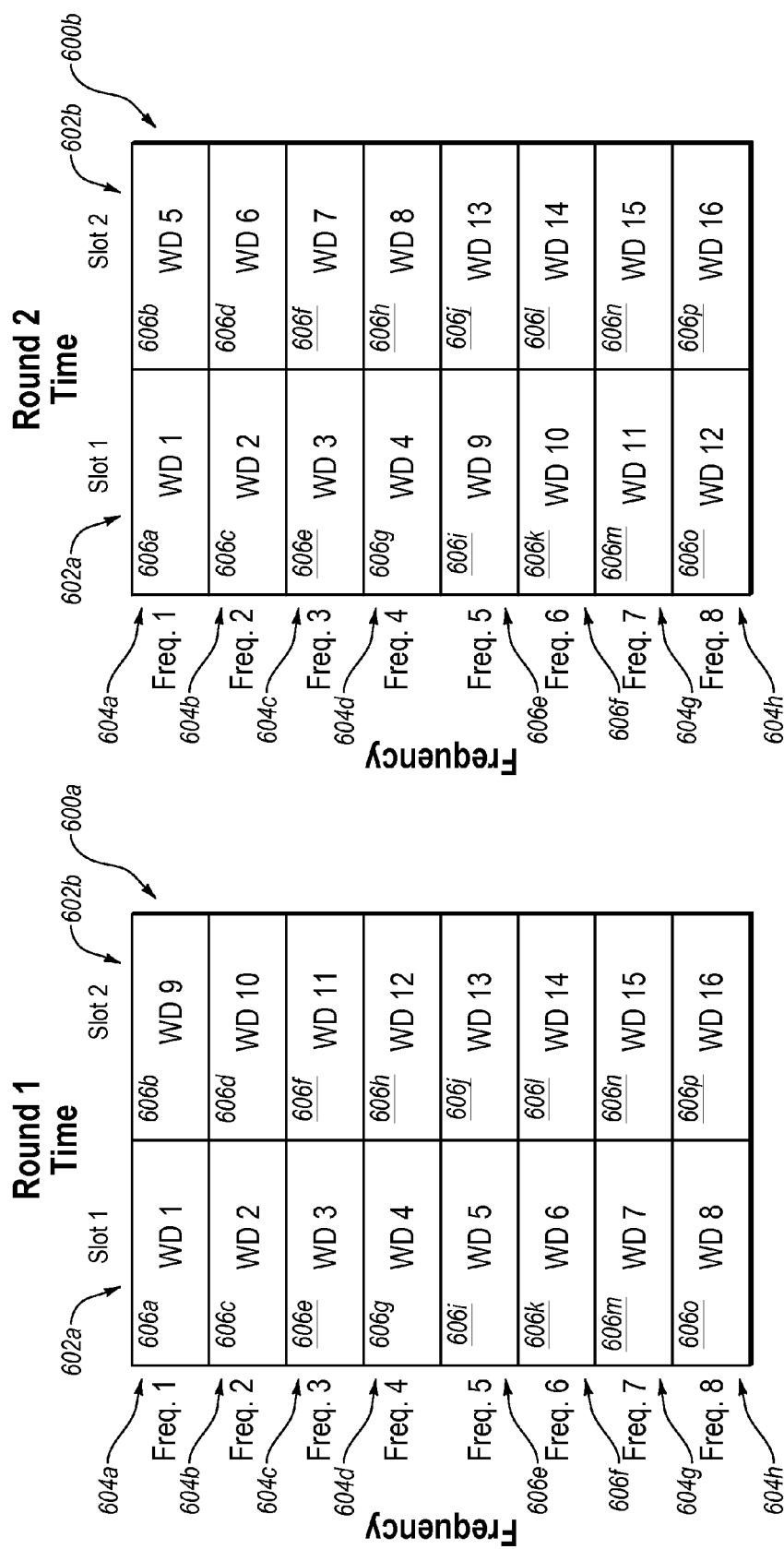

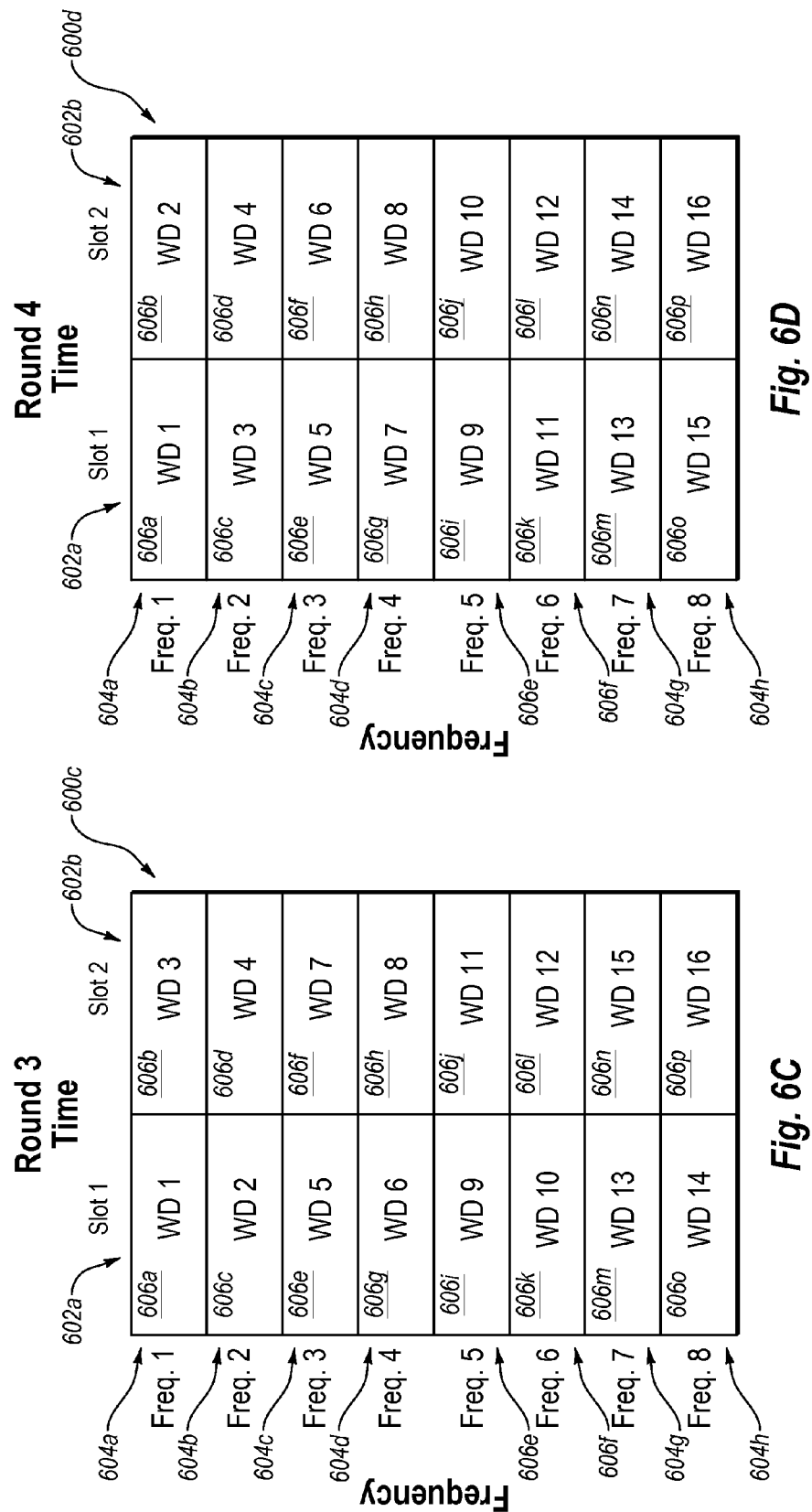

POWER CONTROL OF NEIGHBOR DISCOVERY SIGNALS

FIELD

The present disclosure relates to power control of neighbor discovery signals.

BACKGROUND

The proliferation of smartphones, tablets, laptop computers and other electronic devices (referred to generally as "wireless devices") that use wireless communication networks has created an increasing demand for ubiquitous and continuous wireless voice and data access. Device-to-device (D2D) communication may help satisfy this demand. For example, D2D communication may be performed between wireless devices and may allow the wireless devices to capture information and communicate the information with each other. This D2D communication may allow for reuse of wireless communication resources, which may help satisfy the demand for wireless voice and data access.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of adjusting power of a neighbor discovery signal may include determining a maximum transmission power of a transmitting wireless device. The transmitting wireless device may be configured to transmit a neighbor discovery signal to one or more receiving wireless devices. The one or more receiving wireless devices may be discovered neighbor wireless devices of the transmitting wireless device and may be configured to receive the neighbor discovery signal. The method may further include determining a power level of the neighbor discovery signal based on the maximum transmission power of the transmitting wireless device and a number of the discovered neighbor wireless devices.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A and 3B illustrate example scheduling matrices depicting assignments of neighbor discovery channel resources based on time slot assignment shifting;

FIGS. 6A-6D illustrate example scheduling matrices depicting assignments of neighbor discovery channel resources based on a binary splitting scheme;

DESCRIPTION OF EMBODIMENTS

In particular embodiments, and, as described in further detail below, a wireless communication network may be configured to direct wireless devices to perform neighbor discovery and may instruct one or more sets of wireless devices to perform device-to-device (D2D) communication based on the neighbor discovery. As detailed below, the wireless communication network may direct wireless devices to transmit and receive neighbor discovery signals and may direct one or more sets of wireless devices to perform D2D communication based on the neighbor discovery signals. Additionally, the wireless communication network may be configured to adjust the power of the neighbor discovery signals such that the neighbor discovery signals may not substantially interfere with other wireless signals.

Facilitating D2D communication may allow for lower power communication between the wireless devices themselves and/or the wireless devices and an access point of the wireless communication network. Lower power communication may allow for reuse of a limited frequency band by localizing the use of each frequency band between the wireless devices participating in D2D communication.

Embodiments of the present disclosure will be explained with reference to the accompanying drawings.

Figure 1:
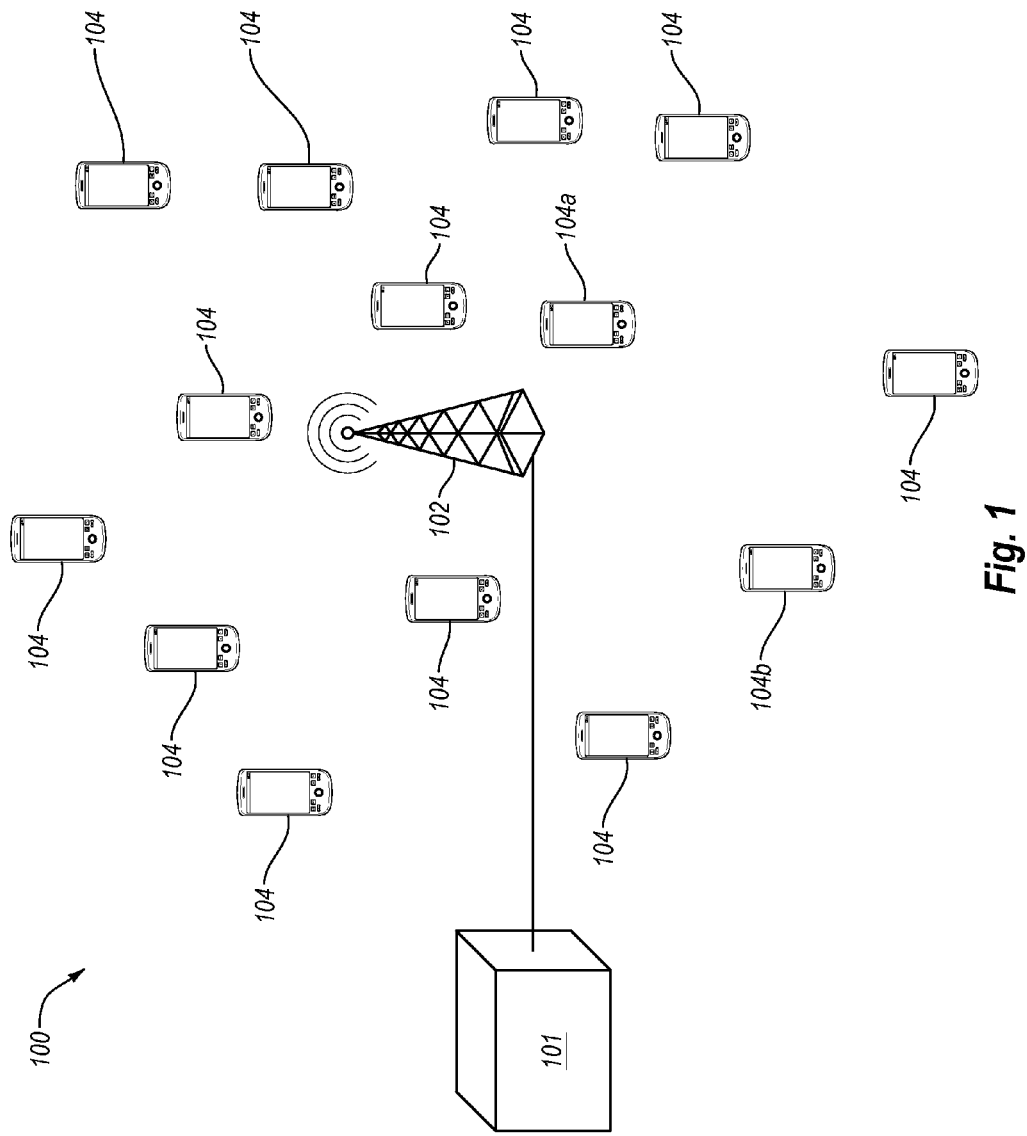
FIG. 1 illustrates an example wireless communication network configured to initiate device-to-device (D2D) communication between wireless devices.

FIG. 1 illustrates an example wireless communication network 100 (referred to hereinafter as "network 100") configured to control the initiation of D2D communication between wireless devices, arranged in accordance with the present disclosure. The network 100 may be configured to provide wireless communication services to one or more wireless devices 104 via one or more access points 102. The wireless communication services may be voice services, data services, messaging services, and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, and/or any other suitable wireless communication network. In some embodiments, the network 100 may be configured as a third generation (3G) wireless communication network and/or a fourth generation (4G) wireless communication network. In these or other embodiments, the network 100 may be configured as a long term evolution (LTE) wireless communication network.

The access point 102 may be any suitable wireless communication network communication point and may include, by way of example but not limitation, a base station, an evolved node "B" (eNB) base station, a remote radio head (RRH), or any other suitable communication point. The wireless devices 104 may include any device that may use the network 100 for obtaining wireless communication services and may include, by way of example and not limitation, a cellular phone, a smartphone, a personal data assistant (PDA), a laptop computer, a personal computer, a tablet computer, or any other similar device.

In some embodiments, as mentioned above, the network 100 may be configured to supervise D2D communication between wireless devices 104. In some of these embodiments, the access point 102 may be configured to direct the discovery of neighboring wireless devices 104 such that neighboring wireless devices 104 may be coupled together as a D2D pair performing D2D communication. The terms "neighbor" and "neighboring" wireless devices may refer to wireless devices that may be in the same general vicinity with respect to each other. The terms are not limited to wireless devices being directly adjacent to each other, or the wireless device or wireless devices closest to a particular wireless device.

For example, a wireless device 104a may be configured to perform a network entry procedure with the access point 102 in response to the wireless device 104a entering a geographical area serviced by the access point 102 (also referred to as a "cell"). Additionally, during or after the network entry procedure, the wireless device 104a may be configured to signal whether the wireless device 104a is capable and/or willing to participate in D2D communication with another wireless device 104. A wireless device 104b may be configured to perform similar operations.

The access point 102 may be configured to instruct the wireless devices 104a and 104b to participate in neighbor discovery when the wireless devices 104a and 104b indicate that they are capable and willing to participate in D2D communication. For example, the access point 102 may be configured to perform radio resource control (RRC) signaling in which the access point 102 may instruct the wireless device 104a and/or the wireless device 104b to transmit a neighbor discovery signal. Additionally, the access point 102 may instruct the wireless device 104a and/or the wireless device 104b to listen for a neighbor discovery signal.

In the illustrated example, the access point 102 may instruct the wireless device 104a to transmit a neighbor discovery signal and may instruct the wireless device 104b to listen for the neighbor discovery signal, at a particular time and frequency. Therefore, the wireless device 104a may be referred to as a "transmitting wireless device 104a" and the wireless device 104b may be referred to as a "receiving wireless device 104b" in the illustrated example. If the receiving wireless device 104b receives the neighbor discovery signal transmitted by the transmitting wireless device 104a, the receiving wireless device may be referred to as a discovered neighbor of the transmitting wireless device 104a.

In the illustrated embodiment, the access point 102 may be configured to perform scheduling of the transmission of the neighbor discovery signal. In some embodiments, the access point 102 may be configured to perform the scheduling by indicating to the transmitting wireless device 104a parameters associated with transmitting the neighbor discovery signal. Additionally, the access point 102 may be configured to instruct the receiving wireless device 104b to listen for the neighbor discovery signal based on the parameters.

The parameters may include a neighbor discovery signal channel (referred to hereinafter as a "discovery channel") that may be used to transmit the neighbor discovery signal; discovery channel resources (e.g., time slots, frequencies, etc.) that may be used to transmit the neighbor discovery signal; transmission sequences of the neighbor discovery signal; transmission power of the neighbor discovery signal; and/or whether or not transmission of the neighbor discovery signal is to be repeated. In some embodiments, the discovery channel may be a channel such as a sounding reference signal (SRS) channel, or may be a physical neighbor discovery channel (PNDCH) that may be configured according to the present disclosure as disclosed in further detail below. Additionally, in some embodiments, the access point 102 may determine the transmission power of the neighbor discovery signal in a manner as described below.

The parameters may also include instructions for the transmitting wireless device 104a and the receiving wireless device 104b to transmit and listen for, respectively, the neighbor discovery signal based on an identifier associated with the access point 102, or based on a temporary identifier assigned by the access point 102. In some embodiments, the identifier may be a radio network temporary identifier (RNTI) associated with the access point 102. The identifier may be used by the transmitting wireless device 104a to transmit the neighbor discovery signal according to a signal pattern associated with the identifier. Additionally, the receiving wireless device 104b may use the identifier to recognize the neighbor discovery signal based on its signal pattern.

The transmitting wireless device 104a may be configured to transmit the neighbor discovery signal based on the received parameters in response to receiving the instructions to transmit the neighbor discovery signal from the access point 102. Additionally, the receiving wireless device 104b may be configured to listen for the neighbor discovery signal according to the parameters received from the access point 102. For example, the transmitting wireless device 104a may transmit the neighbor discovery signal over the PNDCH at a certain time slot, frequency, and signal power using the RNTI associated with the access point 102 as indicated by the parameters received by the transmitting wireless device 104a from the access point 102. The receiving wireless device 104b may be configured to listen for the neighbor discovery signal by listening for signals transmitted over the PNDCH in the particular transmission sequence, as indicated by the parameters received by the receiving wireless device 104b from the access point 102.

The receiving wireless device 104b may also be configured to determine neighbor discovery signal information associated with the neighbor discovery signal as received by the receiving wireless device 104b. For example, the receiving wireless device 104b may be configured to determine discovery channel resources (e.g., frequency and time slot) associated with the neighbor discovery signal, a received signal strength, a signal-to-noise ratio (SNR), etc., of the neighbor discovery signal as received by the receiving wireless device 104b.

The receiving wireless device 104b may be configured to communicate the neighbor discovery signal information to the access point 102. For example, the receiving wireless device 104b may be configured to communicate to the access point 102 an indication of discovery channel resources (e.g., frequency and time slot) associated with the neighbor discovery signal as received by the receiving wireless device 104b as well as a received signal strength indicator (RSSI) of the neighbor discovery signal as measured by the receiving wireless device 104b.

The access point 102 may be configured to determine proximity information of the transmitting wireless device 104a and the receiving wireless device 104b based on the neighbor discovery signal information that may be received by the access point 102 from the receiving wireless device 104b. The proximity information may indicate a distance between the transmitting wireless device 104a and the receiving wireless device 104b. The proximity information may also indicate a path loss between the transmitting wireless device 104a and the receiving wireless device 104b.

Additionally, in some embodiments, the access point 102 may be configured to determine that the transmitting wireless device 104a transmitted the neighbor discovery signal associated with the neighbor discovery signal information received from the receiving wireless device 104b based on the discovery channel resource information included in the neighbor discovery signal information.

For example, as mentioned above, the neighbor discovery signal information may include discovery channel resource information such as a slot time and a frequency associated with the neighbor discovery signal. The access point 102 may be configured to determine that the transmitting wireless device 104a is associated with the time slot and the frequency included in the neighbor discovery signal information. Therefore, the access point 102 may determine that the transmitting wireless device 104a was the wireless device that transmitted the neighbor discovery signal received by the receiving wireless device 104b. Accordingly, the access point 102 may be configured to determine that the receiving wireless device 104b received the neighbor discovery signal from the transmitting wireless device 104a without the receiving wireless device 104b knowing that the transmitting wireless device 102a transmitted the neighbor discovery signal. This configuration may allow for a determination of proximity information of the transmitting wireless device 104a and the receiving wireless device 104b by the access point 102 without having location and global identification information of the transmitting wireless device 104a available to the receiving wireless device 104b and/or other wireless devices 104 of the network 100.

The access point 102 may be configured to report the proximity information of the transmitting wireless device 104a and the receiving wireless device 104b to a network control unit 101 of the network 100. In some embodiments, the network control unit 101 may be included with and at the access point 102 and in other embodiments, the network control unit 101 may be remote from the access point 102. The network control unit 101 may be associated with a core network architecture of a core network of the network 100 and may be configured to perform operations associated with a core network protocol. For example, the network control unit 101 may be included with a Mobility Management Entity (MME), a Serving Gateway (SGW), or a Packet Gateway (PGW) of an LTE core network.

Based on the proximity information, the network control unit 101 may be configured to determine whether the transmitting wireless device 104a and the receiving wireless device 104b are within sufficient range to participate in D2D communication with each other. If the network control unit 101 determines that the transmitting wireless device 104a and the receiving wireless device 104b are within sufficient range to participate in D2D communication, the network control unit 101 may instruct the access point 102 to initiate D2D communication between the transmitting wireless device 104a and the receiving wireless device 104b. The access point 102 may in turn instruct the transmitting wireless device 104a and the receiving wireless device 104b to initiate and to participate in D2D communication.

Modifications, additions, or omissions may be made to FIG. 1 without departing from the scope of the present disclosure. For example, the network 100 may include any number of access points 102 and wireless devices 104. Additionally, any number of D2D pairs may be discovered and initiated with respect to the network 100. Further, the transmitting wireless device 104a and/or the receiving wireless device 104b may be included in other D2D pairs. Also, as mentioned above, the discovery channel used to perform discovery may be a PNDCH. In some embodiments, the PNDCH may be configured such that the wireless devices 104 configured to transmit neighbor discovery signals at approximately the same time may also be configured to transmit neighbor discovery signals at different times. The PNDCH may be configured to change which of the wireless devices 104 transmit neighbor discovery signals at approximately the same time because the wireless devices 104 transmitting neighbor discovery signals may not be able to receive neighbor discovery signals from other of the wireless devices 104 also transmitting neighbor discovery signals at substantially the same time.

Further, at times, the access point 102 may instruct both the wireless devices 104a and 104b to listen for the neighbor discovery signal or to transmit the neighbor discovery signal at approximately the same time. Additionally, at other times, the access point 102 may instruct the wireless device 104b to transmit the neighbor discovery signal while instructing the wireless device 104a to listen for the neighbor discovery signal during the time that the wireless device 104b is transmitting the neighbor discovery signal. Therefore, the "transmitting" wireless device 104a and the "receiving" wireless device 104b may change their roles at various times.

Figure 2:
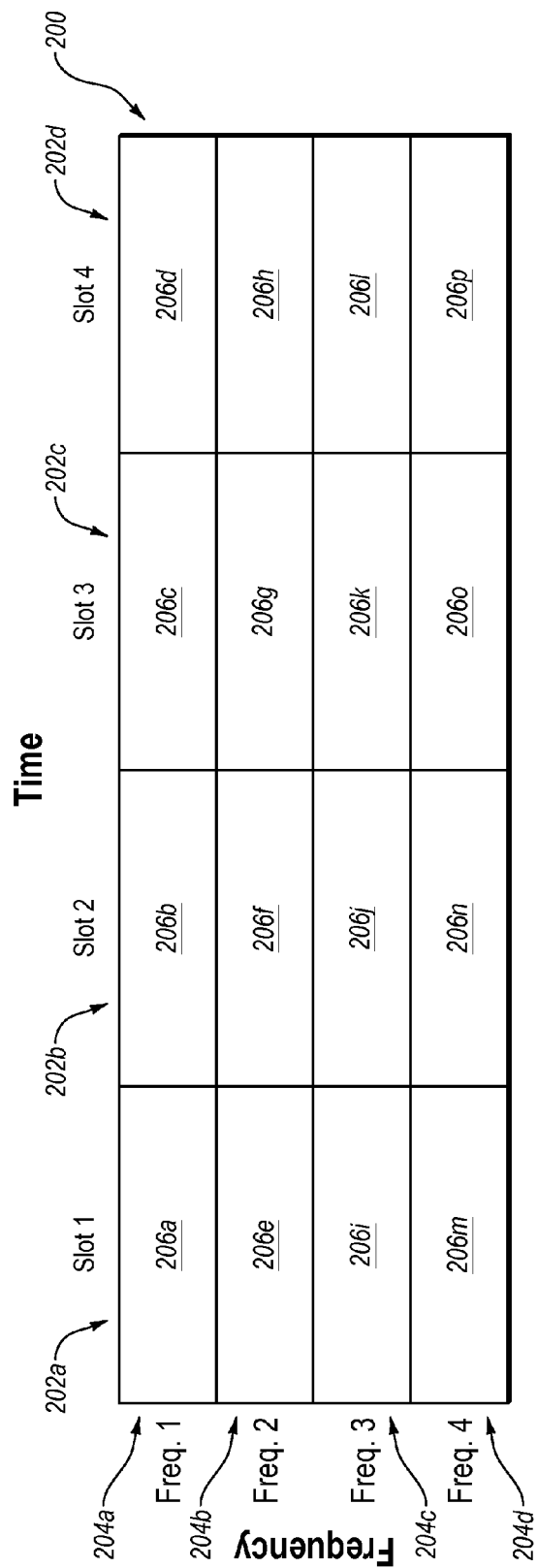
FIG. 2 illustrates an example matrix depicting a configuration of neighbor discovery channel resources.

FIG. 2 illustrates an example scheduling matrix 200 depicting a configuration of PNDCH resources, arranged in accordance with the present disclosure. The matrix 200 may be used to schedule PNDCH resources for a group of wireless devices, such as a group of the wireless devices 104 of FIG. 1. The matrix 200 may include columns 202a-202d and rows 204a-204d. The columns 202a-202d may represent different time slots in which wireless devices of the group associated with the matrix 200 may be assigned to transmit a neighbor discovery signal. Accordingly, the number of columns 202a-202d may indicate the number of time slots that may be used by the group of wireless devices associated with the matrix 200 to transmit neighbor discovery signals in a neighbor discovery round.

The rows 204a-204d may represent different frequencies over which the wireless devices of the group of wireless devices may be assigned to communicate the neighbor discovery signal. In some embodiments, the different frequencies may be distinct frequencies that may be contiguous frequencies within a particular frequency range. In these or other embodiments, one or more of the frequencies may not be contiguous and may be disjointed and distributed within a wide frequency range or bandwidth. Therefore, the number of rows 204a-204d may indicate the number of frequencies and, thus, the number of wireless devices, that may transmit a neighbor discovery signal within each time slot.

Each wireless device of the group of wireless devices associated with the matrix 200 may be assigned to one of elements 206a-206p of the matrix 200. Each element 206 may indicate the frequency and time slot that the wireless device assigned to it may use to transmit its corresponding neighbor discovery signal. Each element 206 of the matrix 200 may thus represent a PNDCH resource that may include a time slot and frequency that may be assigned to a wireless device of the group of wireless devices associated with the matrix 200 for transmission of an associated neighbor discovery signal. For example, the element 206a of the matrix 200 may indicate a PNDCH resource associated with transmitting a neighbor discovery signal at a first time slot ("Slot 1") associated with the column 202a over a first frequency ("Freq. 1") associated with the row 204a. Therefore, a wireless device assigned to the element 206a may be assigned to transmit a neighbor discovery signal over the first frequency and during the first time slot. In other embodiments, the time slots may be represented by the rows 204a-204d of the matrix 200 and the frequencies may be represented by the columns 202a-202d of the matrix 200.

As mentioned above, in some embodiments, wireless devices that are scheduled to transmit a neighbor discovery signal in a given time slot may not be able to receive a neighbor discovery signal transmitted by another wireless device during the same time slot. Therefore, in some embodiments, one or more of the wireless devices may be assigned to one time slot shared by a set of wireless devices during one round of neighbor discovery (which may be referred to as a "neighbor discovery round") and then may be assigned to another time slot shared by another set of wireless devices during another round of neighbor discovery. The inclusion of multiple neighbor discovery rounds and the associated shuffling of time slots assigned to the wireless devices between the neighbor discovery rounds may allow for the wireless devices in the group associated with the matrix 200 to discover each other, even if the wireless devices are given the same time slot during one of the neighbor discovery rounds.

Figure 4A:
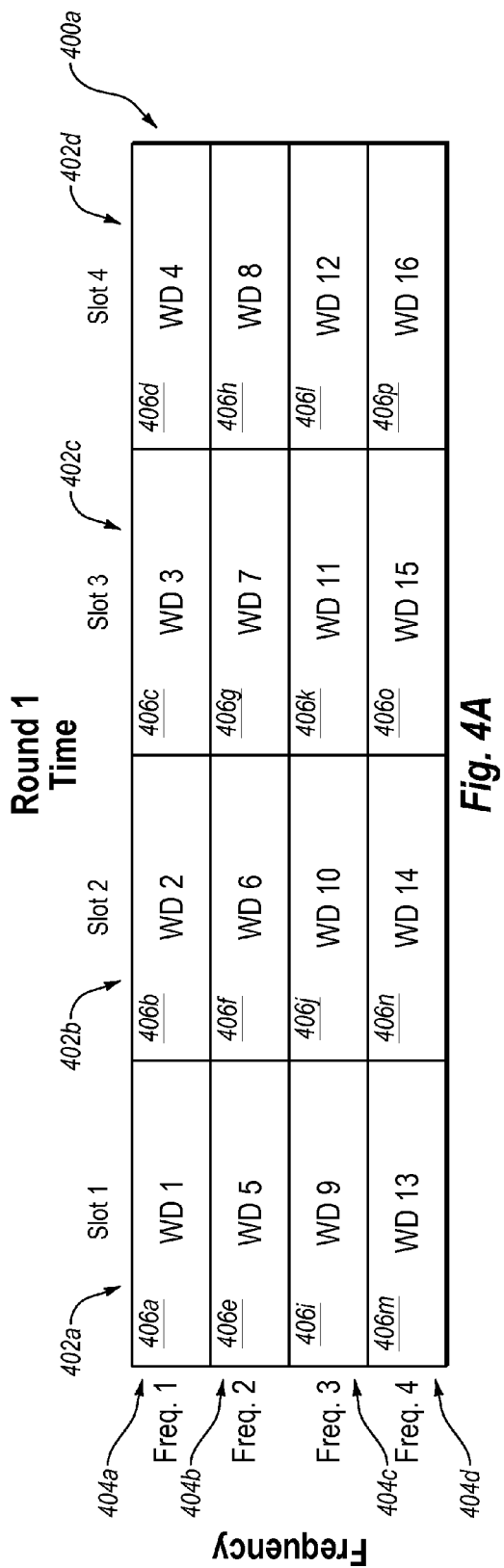
FIGS. 4A and 4B illustrate example scheduling matrices depicting assignments of neighbor discovery channel resources based on time slot and frequency assignment shifting.
Figure 4B:
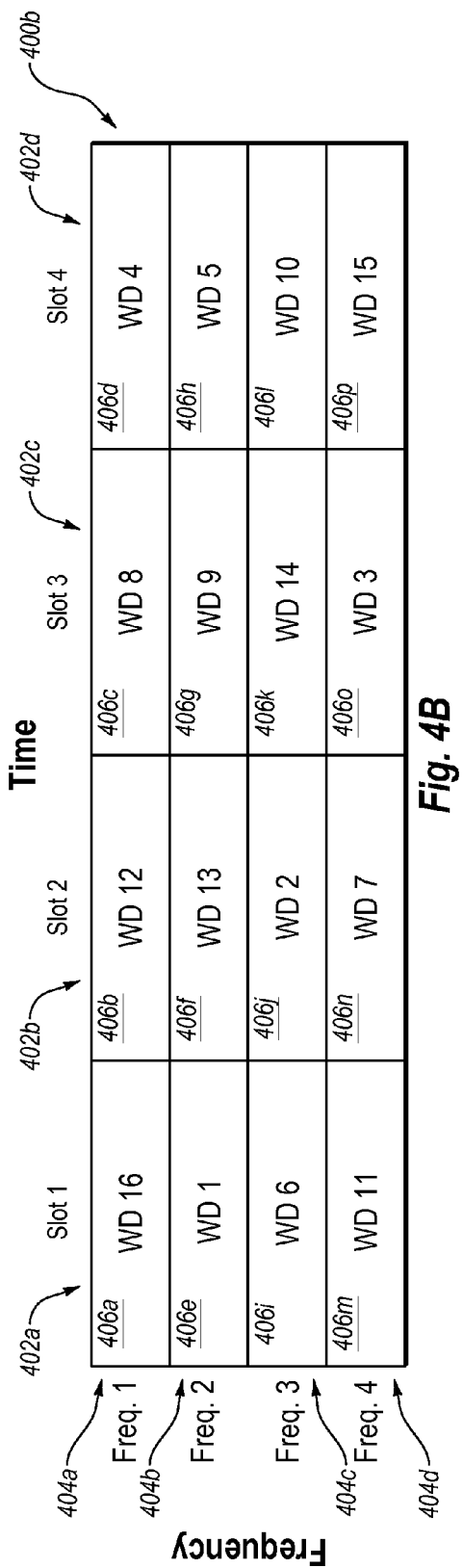

Further, in some instances, the frequencies assigned to one or more wireless devices may also be changed from one neighbor discovery round to another. Sometimes the quality of a neighbor discovery signal received by a receiving wireless device from a transmitting wireless device may be based on which frequency the neighbor discovery signal is being transmitted. Therefore, changing the frequency over which the transmitting wireless device may transmit the neighbor discovery signal may allow for improving the quality of the neighbor discovery signal as received by the receiving wireless device. FIGS. 4A and 4B, described below, illustrate an example of shuffling time slot and frequency assignments based on shifting time slot and frequency assignments.

FIGS. 3A and 3B illustrate example scheduling matrices 300a and 300b, respectively, depicting assignments of PNDCH resources to a group of wireless devices (depicted as wireless devices WD 1-WD 16 in FIGS. 3A and 3B) based on time slot assignment shifting, arranged in accordance with the present disclosure. In the illustrated embodiments, and similar to the scheduling matrix 200 of FIG. 2, the scheduling matrices 300a and 300b may include columns 302a-302d and rows 304a-304d. The columns 302a-302d may represent different time slots in which the wireless devices WD 1-WD 16 may be assigned to transmit a neighbor discovery signal. The rows 304a-304d may represent different frequencies over which the wireless devices WD 1-WD 16 may be assigned to communicate the neighbor discovery signal.

In the illustrated embodiment, the scheduling matrix 300a may indicate frequency and time slot assignments over and in which the wireless devices WD 1-WD 16 may transmit neighbor discovery signals during a first neighbor discovery round (depicted as "Round 1" in FIG. 3A). Accordingly, each of the wireless devices WD 1-WD 16 may be assigned to one of elements 306a-306p of the scheduling matrix 300a, such that each of the wireless devices WD 1-WD 16 may be assigned a particular PNDCH resource (e.g., time slot and transmission frequency) for transmitting a neighbor discovery signal during the first neighbor discovery round.

In some embodiments, a second neighbor discovery round (depicted as "Round 2" in FIG. 3B) may also be used for transmitting the neighbor discovery signals. One or more of the wireless devices WD 1-WD 16 may be assigned a different time slot in the first and second neighbor discovery rounds such that each of the wireless devices WD 1-WD 16 that share the same time slot in the first neighbor discovery round may not share the same time slot in the second neighbor discovery round. In the illustrated embodiment of FIG. 3B, the scheduling matrix 300b may represent PNDCH resource assignments of the wireless devices WD 1-WD 16 associated with the second neighbor discovery round.

In FIGS. 3A and 3B, the changing of time slot assignments from the first neighbor discovery round to the second neighbor discovery round may be accomplished through a cyclic shift of time slot assignments of the wireless devices WD 1-WD 16. In the illustrated embodiments of the scheduling matrices 300a and 300b, to produce the cyclic shift of time slot assignments, the wireless devices assigned a first frequency, "Freq. 1," may remain in their respective time slots from the scheduling matrix 300a to the scheduling matrix 300b; the wireless devices assigned a second frequency, "Freq. 2," may shift one time slot over in the scheduling matrix 300b with respect to their assigned time slots in the scheduling matrix 300a; the wireless devices assigned a third frequency, "Freq. 3," may shift two time slots over in the same direction in the scheduling matrix 300b with respect to their assigned time slots in the scheduling matrix 300a; and the wireless devices assigned a fourth frequency, "Freq. 4," may shift three time slots over in the same direction in the scheduling matrix 300b with respect to their assigned time slots in the scheduling matrix 300a.

For example, in the first neighbor discovery round, as illustrated by the scheduling matrix 300a, the wireless devices WD 1, WD 2, WD 3, and WD 4 may be assigned to the first frequency "Freq. 1" and may be assigned to time slots "Slot 1," "Slot 2," "Slot 3," and "Slot 4," respectively; the wireless devices WD 5, WD 6, WD 7, and WD 8 may be assigned to the second frequency "Freq. 2" and may be assigned to the time slots "Slot 1," "Slot 2," "Slot 3," and "Slot 4," respectively; the wireless devices WD 9, WD 10, WD 11, and WD 12 may be assigned to the third frequency "Freq. 3" and may be assigned to the time slots "Slot 1," "Slot 2," "Slot 3," and "Slot 4," respectively; and the wireless devices WD 13, WD 14, WD 15, and WD 16 may be assigned to the fourth frequency "Freq. 4" and may be assigned to the time slots "Slot 1," "Slot 2," "Slot 3," and "Slot 4," respectively. Therefore, in scheduling matrix 300a (and consequently the first neighbor discovery round), the wireless devices WD 1, WD 5, WD 9, and WD 13 may share a first time slot, "Slot 1;" the wireless devices WD 2, WD 6, WD 10, and WD 14 may share a second time slot, "Slot 2;" the wireless devices WD 3, WD 7, WD 11, and WD 15 may share a third time slot, "Slot 3;" and the wireless devices WD 4, WD 8, WD 12, and WD 16 may share a fourth time slot, "Slot 4."

In the second neighbor discovery round, as illustrated by the scheduling matrix 300b, the wireless devices WD 1, WD 2, WD 3, and WD 4 may still be assigned to the first frequency "Freq. 1;" the wireless devices WD 5, WD 6, WD 7, and WD 8 may still be assigned to the second frequency "Freq. 2;" the wireless devices WD 9, WD 10, WD 11, and WD 12 may still be assigned to the third frequency "Freq. 3;" and the wireless devices WD 13, WD 14, WD 15, and WD 16 may still be assigned to the fourth frequency "Freq. 4." Additionally, the wireless devices WD 1, WD 2, WD 3, and WD 4 may still be assigned to time slots "Slot 1," "Slot 2," "Slot 3," and "Slot 4," respectively.

However, the wireless devices WD 5, WD 6, WD 7, and WD 8 may be shifted one time slot in the scheduling matrix 300b with respect to the scheduling matrix 300a such that the wireless devices WD 5, WD 6, WD 7, and WD 8 may be assigned to the time slots "Slot 4," "Slot 1," "Slot 2," and "Slot 3," respectively, in the scheduling matrix 300b. Further, the wireless devices WD 9, WD 10, WD 11, and WD 12 may be shifted two time slots in the scheduling matrix 300b with respect to the scheduling matrix 300a such that the wireless devices WD 9, WD 10, WD 11, and WD 12 may be assigned to the time slots "Slot 3," "Slot 4," "Slot 1," and "Slot 2," respectively, in the scheduling matrix 300b. Additionally, the wireless devices WD 13, WD 14, WD 15, and WD 16 may be shifted three time slots in the scheduling matrix 300b with respect to the scheduling matrix 300a such that the wireless devices WD 13, WD 14, WD 15, and WD 16 may be assigned to the time slots "Slot 2," "Slot 3," "Slot 4," and "Slot 1," respectively, in the scheduling matrix 300b.

Therefore, in the scheduling matrix 300b, the wireless devices WD 1, WD 6, WD 11, and WD 16 may share the first time slot, "Slot 1;" the wireless devices WD 2, WD 7, WD 12, and WD 13 may share the second time slot, "Slot 2;" the wireless devices WD 3, WD 8, WD 9, and WD 14 may share the third time slot, "Slot 3;" and the wireless devices WD 4, WD 5, WD 10, and WD 15 may share the fourth time slot, "Slot 4." As mentioned above, in the scheduling matrix 300a, the wireless devices WD 1, WD 5, WD 9, and WD 13 may share the first time slot, "Slot 1;" the wireless devices WD 2, WD 6, WD 10, and WD 14 may share the second time slot, "Slot 2;" the wireless devices WD 3, WD 7, WD 11, and WD 15 may share the third time slot, "Slot 3;" and the wireless devices WD 4, WD 8, WD 12, and WD 16 may share the fourth time slot, "Slot 4." Accordingly, the same wireless devices may not share the same time slots in the scheduling matrices 300a and 300b such that the same wireless devices may not transmit the neighbor discovery signal at the same time in the first and second neighbor discovery rounds associated with the scheduling matrices 300a and 300b, respectively.

Modifications may be made to the scheduling matrices 300a and 300b without departing from the scope of the present disclosure. For example, the number of columns 302 (and accordingly a number of time slots) and/or the number of rows 304 (and accordingly a number of frequencies) may vary. Further, the manner of performing the cyclic time shift may differ from that described. For example, the number of time slots and direction by which a wireless device may be shifted time slot assignments may vary. Additionally, in some embodiments, the time slots may be represented by the rows 304a-304d of the scheduling matrices 300a and 300b and the frequencies may be represented by the columns 302a-302d of the scheduling matrices 300a and 300b.

FIGS. 4A and 4B illustrate example scheduling matrices 400a and 400b, respectively, depicting assignments of PNDCH resources to wireless devices WD 1-WD 16 based on time slot and frequency assignment shifting, arranged in accordance with the present disclosure. In the illustrated embodiments and similar to the scheduling matrix 200 of FIG. 2, the scheduling matrices 400a and 400b may include columns 402a-402d and rows 404. The columns 402a-402d may represent different time slots in which the wireless devices WD 1-WD 16 may be assigned to transmit a neighbor discovery signal. The rows 404a-404d may represent different frequencies over which the wireless devices WD 1-WD 16 may be assigned to communicate their respective neighbor discovery signals.

In the illustrated embodiment and similar to the scheduling matrix 300a of FIG. 3A, the scheduling matrix 400a may indicate frequency and time slot assignments over and in which the wireless devices WD 1-WD 16 may transmit neighbor discovery signals during a first neighbor discovery round (illustrated as "Round 1" in FIG. 4A) by assigning each of the wireless devices WD 1-WD 16 to one of elements 406a-406p of the scheduling matrix 400a. Additionally, similar to the scheduling matrix 300b of FIG. 3B, the scheduling matrix 400b may indicate frequency and time slot assignments over and in which the wireless devices WD 1-WD 16 may transmit neighbor discovery signals during a second neighbor discovery round (illustrated as "Round 2" in FIG. 4B) by assigning each of the wireless devices WD 1-WD 16 to one of elements 406a-406p of the scheduling matrix 400b.

In FIGS. 4A and 4B, the changing of time slot assignments from the first neighbor discovery round to the second neighbor discovery round may be accomplished through a cyclic shift of time slot assignments of the wireless devices WD 1-WD 16 similar to the cyclic shift of time slot assignments described with respect to FIGS. 3A and 3B. However, unlike in FIGS. 3A and 3B, one or more of the wireless devices WD 1-WD 16 may also be assigned different frequencies in the scheduling matrix 400b with respect to their assigned frequencies in the scheduling matrix 400a. As mentioned above, the changing of frequency assignments may allow for improved neighbor discovery signal communication as some frequencies may experience less pathloss than other frequencies from one of the wireless devices WD 1-WD 16 to another.

In the illustrated embodiments of the scheduling matrices 400a and 400b and similar to as described above with respect to the scheduling matrices 300a and 300b of FIGS. 3A and 3B, respectively, to produce the cyclic shift in time slots, the wireless devices assigned a first frequency, "Freq. 1," in the scheduling matrix 400a may remain in their respective time slots from the scheduling matrix 400a to the scheduling matrix 400b; the wireless devices assigned a second frequency, "Freq. 2," in the scheduling matrix 400a may shift one time slot over in the scheduling matrix 400b with respect to their assigned time slots in the scheduling matrix 400a; the wireless devices assigned a third frequency, "Freq. 3," in the scheduling matrix 400a may shift two time slots over in the scheduling matrix 400b with respect to their assigned time slots in the scheduling matrix 400a; and the wireless devices assigned a fourth frequency, "Freq. 4," in the scheduling matrix 400a may shift three time slots over in the scheduling matrix 400b with respect to their assigned time slots in the scheduling matrix 400a.

However, unlike the scheduling matrices 300a and 300b, in the scheduling matrices 400a and 400b, the wireless devices assigned to a first time slot, "Slot 1," in the scheduling matrix 400b may be assigned to a different frequency in the scheduling matrix 400b with respect to their frequency assignment in the scheduling matrix 400a based on a frequency shift of one. The wireless devices assigned to a second time slot, "Slot 2," in the scheduling matrix 400b may be assigned to a different frequency in the scheduling matrix 400b with respect to their frequency assignment in the scheduling matrix 400a based on a frequency shift of two. The wireless devices assigned to a third time slot, "Slot 3," in the scheduling matrix 400b may be assigned to a different frequency in the scheduling matrix 400b with respect to their frequency assignment in the scheduling matrix 400*a* based on a frequency shift of three; and the wireless devices assigned to a fourth time slot, "Slot 4," in the scheduling matrix 400*b* may be assigned to their same frequencies in the scheduling matrix 400*b* with respect to their frequency assignment in the scheduling matrix 400*a*. The frequency shifting may thus produce a change in frequency assignments between the first and second neighbor discovery rounds associated with the scheduling matrices 400*a* and 400*b*, respectively.

For example, in the first neighbor discovery round, as illustrated by the scheduling matrix 400*a* and similar to the scheduling matrix 300*a* of FIG. 3A, the wireless devices WD 1, WD 2, WD 3, and WD 4 may be assigned to the first frequency "Freq. 1" and may be assigned to the time slots "Slot 1," "Slot 2," "Slot 3," and "Slot 4," respectively; the wireless devices WD 5, WD 6, WD 7, and WD 8 may be assigned to the second frequency "Freq. 2" and may be assigned to the time slots "Slot 1," "Slot 2," "Slot 3," and "Slot 4," respectively; the wireless devices WD 9, WD 10, WD 11, and WD 12 may be assigned to the third frequency "Freq. 3" and may be assigned to the time slots "Slot 1," "Slot 2," "Slot 3," and "Slot 4," respectively; and the wireless devices WD 13, WD 14, WD 15, and WD 16 may be assigned to the fourth frequency "Freq. 4" and may be assigned to the time slots "Slot 1," "Slot 2," "Slot 3," and "Slot 4," respectively. Therefore, in the scheduling matrix 400*a*, the wireless devices WD 1, WD 5, WD 9, and WD 13 may share a first time slot, "Slot 1," wireless devices WD 2, WD 6, WD 10, and WD 14 may share a second time slot, "Slot 2," wireless devices WD 3, WD 7, WD 11, and WD 15 may share a third time slot, "Slot 3," and wireless devices WD 4, WD 8, WD 12, and WD 16 may share a fourth time slot, "Slot 4."

In the second neighbor discovery round, as illustrated by the scheduling matrix 400*b* and similar to the scheduling matrix 300*b* of FIG. 3B, the wireless devices WD 1, WD 2, WD 3, and WD 4 may still be assigned to the time slots "Slot 1," "Slot 2," "Slot 3," and "Slot 4," respectively, in the scheduling matrix 400*b*. Additionally, the wireless devices WD 5, WD 6, WD 7, and WD 8 may be shifted one time slot in the scheduling matrix 400*b* with respect to the scheduling matrix 400*a* such that the wireless devices WD 5, WD 6, WD 7, and WD 8 may be assigned to the time slots "Slot 4," "Slot 1," "Slot 2," and "Slot 3," respectively, in the scheduling matrix 400*b*. Further, the wireless devices WD 9, WD 10, WD 11, and WD 12 may be shifted two time slots in the scheduling matrix 400*b* with respect to the scheduling matrix 400*a* such that the wireless devices WD 9, WD 10, WD 11, and WD 12 may be assigned to time slots "Slot 3," "Slot 4," "Slot 1," and "Slot 2," respectively, in the scheduling matrix 400*b*. Additionally, the wireless devices WD 13, WD 14, WD 15, and WD 16 may be shifted three time slots in the scheduling matrix 300*b* with respect to the scheduling matrix 400*a* such that the wireless devices WD 13, WD 14, WD 15, and WD 16 may be assigned to time slots "Slot 2," "Slot 3," "Slot 4," and "Slot 1," respectively, in the scheduling matrix 400*b*.

Additionally, in scheduling matrix 400*b*, the wireless devices WD 1, WD 6, WD 11 and WD 16 of the time slot "Slot 1" of the scheduling matrix 400*b* may be shifted by one frequency with respect to their assigned frequencies in the scheduling matrix 400*a* such that the wireless devices WD 1, WD 6, WD 11 and WD 16 may be assigned to frequencies "Freq. 2," "Freq. 3," "Freq. 4," and "Freq. 1," respectively, in the scheduling matrix 400*b*. Further, the wireless devices WD 2, WD 7, WD 12 and WD 13 of the time slot "Slot 2" of the scheduling matrix 400*b* may be shifted by two frequencies with respect to their assigned frequencies in the scheduling matrix 400*a* such that the wireless devices WD 2, WD 7, WD 12 and WD 13 may be assigned to frequencies "Freq. 3," "Freq. 4," "Freq. 1," and "Freq. 2," respectively, in the scheduling matrix 400*b*. Also, the wireless devices WD 3, WD 8, WD 9 and WD 14 of the time slot "Slot 3" of the scheduling matrix 400*b* may be shifted by three frequencies with respect to their assigned frequencies in the scheduling matrix 400*a* such that the wireless devices WD 3, WD 8, WD 9 and WD 14 may be assigned to frequencies "Freq. 4," "Freq. 1," "Freq. 2," and "Freq. 3," respectively, in the scheduling matrix 400*b*. Additionally, the wireless devices WD 4, WD 5, WD 10, and WD 15 of the time slot "Slot 4" of the scheduling matrix 400*b* may be assigned to the same frequencies in the scheduling matrix 400*b* as in the scheduling matrix 400*a*.

Therefore, in the scheduling matrices 400*a* and 400*b*, the same wireless devices may not share the same time slots or neighbor discovery signal frequencies in the first and second neighbor discovery rounds. Accordingly, the same wireless devices may not transmit the neighbor discovery signal at the same time or over the same frequencies in the first and second neighbor discovery rounds associated with the scheduling matrices 400*a* and 400*b*, respectively.

Modifications may be made to the scheduling matrices 400*a* and 400*b* without departing from the scope of the present disclosure. For example, the number of columns 402 (and accordingly the number of time slots) and/or the number of rows 404 (and accordingly the number of frequencies) may vary. Further, the manner of performing the cyclic time shift and/or frequency shift may differ from that described. For example, the number of time slots or frequencies and directions by which a wireless device may be shifted may vary. Additionally, in some embodiments, the time slots may be represented by the rows 404*a*-404*d* of the scheduling matrices 400*a* and 400*b* and the frequencies may be represented by the columns 402*a*-402*d* of the scheduling matrices 400*a* and 400*b*.

Figure 5A:
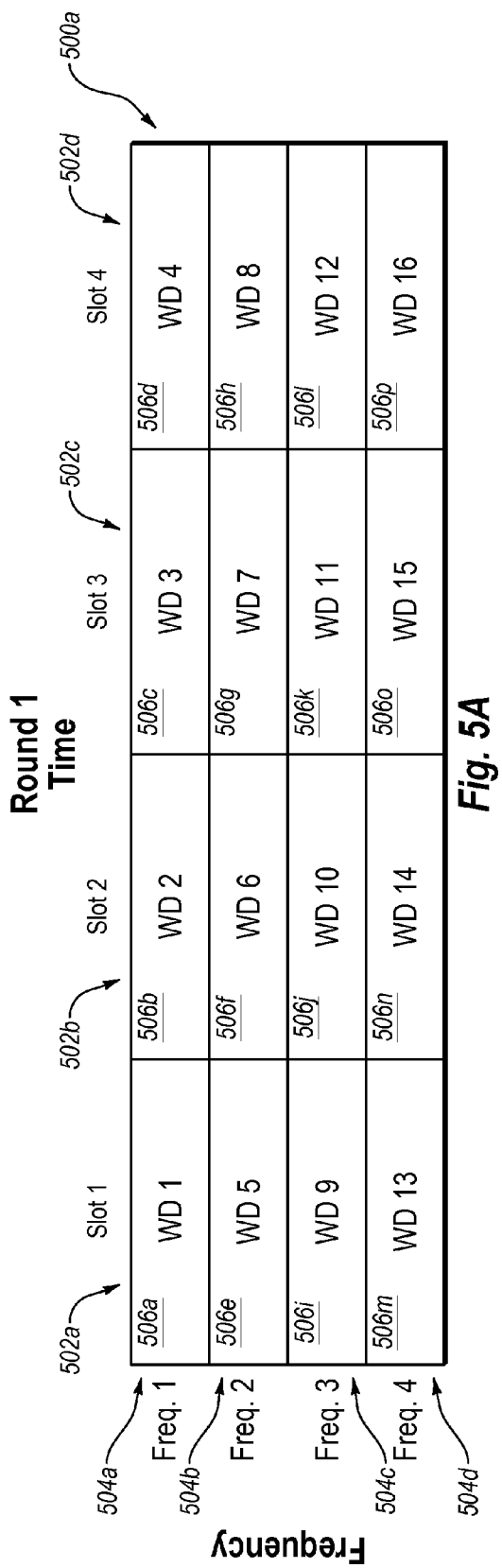
FIGS. 5A and 5B illustrate example scheduling matrices depicting assignments of neighbor discovery channel resources based on matrix transposition.
Figure 5B:
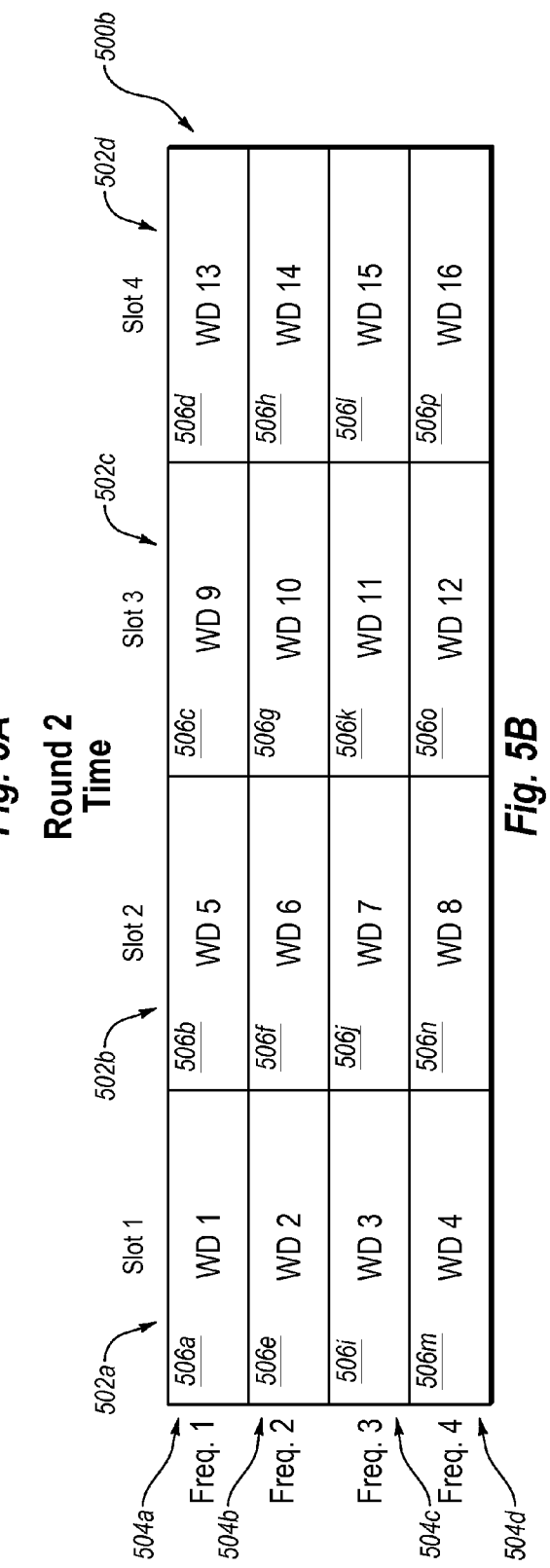

FIGS. 5A and 5B illustrate example scheduling matrices 500*a* and 500*b*, respectively, depicting assignments of PNDCH resources to the wireless devices WD 1-WD 16 based on matrix transposition, arranged in accordance with the present disclosure. In the illustrated embodiments, and similar to the scheduling matrix 200 of FIG. 2, the scheduling matrices 500*a* and 500*b* may include columns 502*a*-502*d* and rows 504*a*-504*d*. The columns 502*a*-502*d* may represent different time slots in which the wireless devices WD 1-WD 16 may be assigned to transmit a neighbor discovery signal. The rows 504*a*-504*d* may represent different frequencies over which the wireless devices WD 1-WD 16 may be assigned to communicate their neighbor discovery signals.

In the illustrated embodiment and similar to the scheduling matrix 300*a* of FIG. 3A, the scheduling matrix 500*a* may indicate frequency and time slot assignments over and in which the wireless devices WD 1-WD 16 may transmit neighbor discovery signals during a first neighbor discovery round (illustrated as "Round 1" in FIG. 5A) by assigning each of the wireless devices WD 1-WD 16 to one of elements 506*a*-506*p* of the scheduling matrix 500*a*. Additionally, similar to the scheduling matrix 300*b* of FIG. 3B, the scheduling matrix 500*b* may indicate frequency and time slot assignments over and in which the wireless devices WD 1-WD 16 may transmit neighbor discovery signals during a second neighbor discovery round (illustrated as "Round 2"

in FIG. 5B) by assigning each of the wireless devices WD 1-WD 16 to one of elements 506a-506p of the scheduling matrix 500b.

In FIGS. 5A and 5B, the changing of time slot and frequency assignments from the first neighbor discovery round to the second neighbor discovery round may be accomplished through a transposition of the scheduling matrix 500a to generate the scheduling matrix 500b. During matrix transposition, the rows of a matrix are assigned as the columns of an associated transposed matrix and the columns of the matrix are assigned as the rows of the associated transposed matrix. Accordingly, in the illustrated embodiments of the scheduling matrices 500a and 500b, the wireless devices assigned to a first time slot ("Slot 1") in the scheduling matrix 500a may be assigned to a first frequency ("Freq. 1") in the scheduling matrix 500b; the wireless devices assigned to a second time slot ("Slot 2") in the scheduling matrix 500a may be assigned to a second frequency ("Freq. 2") in the scheduling matrix 500b; the wireless devices assigned to a third time slot ("Slot 3") in the scheduling matrix 500a may be assigned to a third frequency ("Freq. 3") in the scheduling matrix 500b; and the wireless devices assigned to a fourth time slot ("Slot 4") in the scheduling matrix 500a may be assigned to a fourth frequency ("Freq. 4") in the scheduling matrix 500b.

For example, in the scheduling matrix 500a and similar to the scheduling matrix 300a of FIG. 3A, the wireless devices WD 1, WD 2, WD 3, and WD 4 may be assigned to the first frequency "Freq. 1" and may be assigned to the time slots "Slot 1," "Slot 2," "Slot 3," and "Slot 4," respectively; the wireless devices WD 5, WD 6, WD 7, and WD 8 may be assigned to the second frequency "Freq. 2" and may be assigned to the time slots "Slot 1," "Slot 2," "Slot 3," and "Slot 4," respectively; the wireless devices WD 9, WD 10, WD 11, and WD 12 may be assigned to the third frequency "Freq. 3" and may be assigned to the time slots "Slot 1," "Slot 2," "Slot 3," and "Slot 4," respectively; and the wireless devices WD 13, WD 14, WD 15, and WD 16 may be assigned to the fourth frequency "Freq. 4" and may be assigned to the time slots "Slot 1," "Slot 2," "Slot 3," and "Slot 4," respectively.

The transposition of the scheduling matrix 500a to generate the scheduling matrix 500b may be such that the wireless devices WD 1, WD 2, WD 3, and WD 4 may be assigned to the first time slot ("Slot 1") and may be assigned to the frequencies "Freq. 1," "Freq. 2," "Freq. 3," and "Freq. 4," respectively, in the scheduling matrix 500b; the wireless devices WD 5, WD 6, WD 7, and WD 8 may be assigned to the second time slot ("Slot 2") and may be assigned to the frequencies "Freq. 1," "Freq. 2," "Freq. 3," and "Freq. 4," respectively, in the scheduling matrix 500b; the wireless devices WD 9, WD 10, WD 11, and WD 12 may be assigned to the third time slot ("Slot 3") and may be assigned to the frequencies "Freq. 1," "Freq. 2," "Freq. 3," and "Freq. 4," respectively, in the scheduling matrix 500b; and the wireless devices WD 13, WD 14, WD 15, and WD 16 may be assigned to the fourth time slot ("Slot 4") and may be assigned to the frequencies "Freq. 1," "Freq. 2," "Freq. 3," and "Freq. 4," respectively, in the scheduling matrix 500b.

Therefore, in the scheduling matrices 500a and 500b, the same wireless devices may not share the same time slots or neighbor discovery signal frequencies. Accordingly, as with the scheduling matrices 400a and 400b, the same wireless devices may not transmit the neighbor discovery signal at the same time or over the same frequencies in the first and second neighbor discovery rounds associated with the scheduling matrices 500a and 500b, respectively.

Modifications may be made to the scheduling matrices 500a and 500b without departing from the scope of the present disclosure. For example, the number of columns 502 (and accordingly the number of time slots) and/or the number of rows 504 (and accordingly the number of frequencies) may vary. Additionally, in some embodiments, the time slots may be represented by the rows 504a-504d of the scheduling matrices 500a and 500b and the frequencies may be represented by the columns 502a-502d of the scheduling matrices 500a and 500b FIGS. 6A-6D illustrate example scheduling matrices 600a, 600b, 600c, and 600d, respectively, depicting assignments of PNDCH resources to wireless devices WD 1-WD 16 based on a binary splitting scheme, arranged in accordance with the present disclosure. In the illustrated embodiments, and similar to the scheduling matrix 200 of FIG. 2, the scheduling matrices 600a-600d may include columns 602a-602d and rows 604a-604d. The columns 602a-602d may represent different time slots in which the wireless devices WD 1-WD 16 may be assigned to transmit a neighbor discovery signal. The rows 604a-604d may represent different frequencies over which the wireless devices WD 1-WD 16 may be assigned to communicate their neighbor discovery signals. In the illustrated embodiment, the scheduling matrices 600a-600d may indicate frequency and time slot assignments over and in which the wireless devices WD 1-WD 16 may transmit neighbor discovery signals during first, second, third, and fourth neighbor discovery rounds, respectively, by assigning each of the wireless devices WD 1-WD 16 to one of elements 606a-606p of the scheduling matrices 600a-600d.

In FIGS. 6A-6D, the changing of time slot and frequency assignments between neighbor discovery rounds may be accomplished through a binary splitting scheme. The binary splitting scheme may be used to assign different ones of the wireless devices WD 1-WD 16 to different time slots in different neighbor discovery rounds such that the wireless devices WD 1-WD 16 may discover each other during at least one of the neighbor discovery rounds. Additionally, the binary splitting scheme may assign different frequencies to different ones of the wireless devices WD 1-WD 16 during different neighbor discovery rounds.

The binary splitting scheme may be performed with respect to scheduling matrices that are associated with scheduling wireless devices of a group according to two time slots, as illustrated by the scheduling matrices 600a-600d. To generate the time slot and frequency assignments for the second neighbor discovery round, the binary splitting scheme may divide the elements wireless devices assigned to the first time slot in the first neighbor discovery round into two equal number groups of first-time-slot wireless devices. The binary splitting scheme may also divide the wireless devices assigned to the second time slot in the first neighbor discovery round into two equal number groups of second-time-slot wireless devices. To generate the time slot and frequency assignments for the second neighbor discovery round, one group of first-time-slot wireless devices may exchange assignments with a group of second-time-slot wireless devices.

To generate the time slot and frequency assignments for the third neighbor discovery round, the number of time slot groups used may be doubled with respect to the number of time slot groups used to generate the time slot and frequency assignments for the second neighbor discovery round. Therefore, the wireless devices assigned to the first time slot in the second neighbor discovery round may be divided into four equal number first-time-slot groups and the wireless devices assigned to the second time slot in the second neighbor discovery round may be divided into four equal number second-time-slot groups. To generate the time slot and frequency assignments for the third neighbor discovery round, two groups of the first-time-slot wireless devices may exchange assignments with two groups of the second-time-slot wireless devices.

In some embodiments, this process of doubling the number of first-time-slot groups and second-time-slot groups between neighbor discovery rounds and exchanging assignments between half of the time slot groups may be repeated until the time slot and frequency assignments for a neighbor discovery round are based on exchanging assignments between time slot groups that may include only one wireless device. After the time slot groups include only one wireless device, the binary splitting scheme may repeat. Accordingly, the number of neighbor discovery rounds used in the binary splitting scheme may be based on the number of wireless devices assigned to each time slot.

As mentioned earlier, FIGS. 6A-6D and their associated matrices 600a-600d illustrate an example operation of the binary splitting scheme. In the illustrated example of FIGS. 6A-6D, the number of wireless devices assigned to each time slot may be eight such that the number of neighbor discovery rounds that may occur before repeating assignments may be four.

As mentioned above, the scheduling matrix 600a of FIG. 6A may be associated with the time slot and frequency assignments of the wireless devices WD 1-WD 16 in a first round of neighbor discovery (depicted as "Round 1"). As illustrated by the scheduling matrix 600a, in the first neighbor discovery round, the wireless devices WD 1-WD 8 may be assigned to a first time slot ("Slot 1") and frequencies "Freq. 1"-"Freq. 8," respectively. Additionally, in the first neighbor discovery round, the wireless devices WD 9-WD 16 may be assigned to a second time slot ("Slot 2") and frequencies "Freq. 1"-"Freq. 8," respectively.

To determine the time slot and frequency assignments for the second round of neighbor discovery (depicted as "Round 2" in FIG. 6B), the binary splitting scheme may be used to generate the scheduling matrix 600b, based on the scheduling matrix 600a. For example, the wireless devices WD 1-WD 8 in the first time slot ("Slot 1") in the scheduling matrix 600a may be divided into a first-time-slot group "A1" and a first-time-slot group "B1." The first-time-slot group "A1" may include the wireless devices WD1-WD 4 and the first-time-slot group "B1" may include the wireless devices WD 5-WD 8. Additionally, the wireless devices WD 9-WD 16 in the second time slot ("Slot 2") in the scheduling matrix 600a may be divided into a second-time-slot group "A1" and a second-time-slot group "B1." The second-time-slot group "A1" may include the wireless devices WD9-WD 12 and the second-time-slot group "B1" may include the wireless devices WD 13-WD 16. To generate the scheduling matrix 600b (and consequently the time slot and frequency assignments for the second neighbor discovery round), the first-time-slot group "B1" (wireless devices WD 5-WD 8) of the scheduling matrix 600a may switch time slot and frequency assignments with the second-time-slot group "A1" (wireless devices WD 9-WD 12) of the scheduling matrix 600a. Additionally, the time slot and frequency assignments of the wireless devices associated with the first-time-slot group "A1" (wireless devices WD 1-WD 4) and the second-time-slot group "B1" (wireless devices WD 13-WD 16) of the scheduling matrix 600a may be the same in the scheduling matrix 600b as in the scheduling matrix 600a.

Therefore, as illustrated by the scheduling matrix 600b, in the second neighbor discovery round, the wireless devices WD 1-WD 4 and WD 9-WD 12 may be assigned to the first time slot ("Slot 1") and may be assigned to the frequencies "Freq. 1"-"Freq. 8," respectively. Additionally, in the second neighbor discovery round, the wireless devices WD 5-WD 8 and WD 13-WD 16 may be assigned to the second time slot ("Slot 2") and may be assigned to the frequencies "Freq. 1"-"Freq. 8," respectively.

To determine the time slot and frequency assignments for the third round of neighbor discovery (depicted as "Round 3" in FIG. 6C), the binary splitting scheme may be used to generate the scheduling matrix 600c, based on the scheduling matrix 600b. For example, the wireless devices WD 1-WD 4 and WD 9-WD 12 in the first time slot ("Slot 1") in the scheduling matrix 600b may be divided into a first-time-slot group "A2," a first-time-slot group "B2," a first-time-slot group "C2," and a first-time-slot group "D2." The first-time-slot group "A2" of the scheduling matrix 600b may include the wireless devices WD1 and WD 2; the first-time-slot group "B2" of the scheduling matrix 600b may include the wireless devices WD 3 and WD 4; the first-time-slot group "C2" of the scheduling matrix 600b may include the wireless devices WD 9 and WD 10; and the first-time-slot group "D2" of the scheduling matrix 600b may include the wireless devices WD 11 and WD 12.

Additionally, the wireless devices WD 5-WD 8 and WD 13-WD 16 in the second time slot ("Slot 2") in the scheduling matrix 600b may be divided into a second-time-slot group "A2," a second-time-slot group "B2," a second-time-slot group "C2," and a second-time-slot group "D2." The second-time-slot group "A2" of the scheduling matrix 600b may include the wireless devices WD 5 and WD 6; the second-time-slot group "B2" of the scheduling matrix 600b may include the wireless devices WD 7 and WD 8; the second-time-slot group "C2" of the scheduling matrix 600b may include the wireless devices WD 13 and WD 14; and the second-time-slot group "D2" of the scheduling matrix 600b may include the wireless devices WD 15 and WD 16.

To generate the scheduling matrix 600c (and consequently the time slot and frequency assignments for the third neighbor discovery round), the first-time-slot group "B2" (wireless devices WD 3 and WD 4) of the scheduling matrix 600b may switch time slot and frequency assignments with the second-time-slot group "A2" (wireless devices WD 5 and WD 6) of the scheduling matrix 600b. Further, the first-time-slot group "D2" (wireless devices WD 11 and WD 12) of the scheduling matrix 600b may switch time slot and frequency assignments with the second-time-slot group "C2" (wireless devices WD 13 and WD 14) of the scheduling matrix 600b. Additionally, the time slot and frequency assignments of the wireless devices associated with the first-time-slot groups "A2" (wireless devices WD 1 and WD 2) and "C2" (wireless devices WD 9 and WD 10) and the second-time-slot groups "B2" (wireless devices WD 7 and WD 8) and "D2" (wireless devices WD 15 and WD 16) of the scheduling matrix 600b may be the same in the scheduling matrix 600c as in the scheduling matrix 600b.

Therefore, as illustrated by the scheduling matrix 600c, in the third neighbor discovery round, the wireless devices WD 1, WD 2, WD 5, WD 6, WD 9, WD 10, WD 13, and WD 14 may be assigned to the first time slot ("Slot 1") and may be assigned to the frequencies "Freq. 1"-"Freq. 8," respectively. Additionally, in the third neighbor discovery round, the wireless devices WD 3, WD 4, WD 7, WD 8, WD 11, WD 12, WD 15, and WD 16 may be assigned to the second time slot ("Slot 2") and may be assigned to frequencies "Freq. 1"-"Freq. 8," respectively.

To determine the time slot and frequency assignments for the fourth round of neighbor discovery (depicted as "Round 4" in FIG. 6D), the binary splitting scheme may be used to generate the scheduling matrix 600d based on the scheduling matrix 600c. For example, the wireless devices WD 1, WD 2, WD 5, WD 6, WD 9, WD 10, WD 13, and WD 14 in the first time slot ("Slot 1") in the scheduling matrix 600c may be divided into a first-time-slot group "A3," a first-time-slot group "B3," a first-time-slot group "C3," a first-time-slot group "D3," a first-time-slot group "E3," a first-time-slot group "F3," a first-time-slot group "G3," and a first-time-slot group "H3." The first-time-slot group "A3" of the scheduling matrix 600c may include the wireless device WD 1; the first-time-slot group "B3" of the scheduling matrix 600c may include the wireless device WD 2; the first-time-slot group "C3" of the scheduling matrix 600c may include the wireless device WD 5, the first-time-slot group "D3" of the scheduling matrix 600c may include the wireless device WD 6; the first-time-slot group "E3" of the scheduling matrix 600c may include the wireless device WD 9; the first-time-slot group "F3" of the scheduling matrix 600c may include the wireless device WD 10; the first-time-slot group "G3" of the scheduling matrix 600c may include the wireless device WD 13; and the first-time-slot group "H3" of the scheduling matrix 600c may include the wireless device WD 14.

Additionally, the wireless devices in the second time slot in the scheduling matrix 600c may be divided into a second-time-slot group "A3," a second-time-slot group "B3," a second-time-slot group "C3," a second-time-slot group "D3," a second-time-slot group "E3," a second-time-slot group "F3," a second-time-slot group "G3," and a second-time-slot group "H3." The second-time-slot group "A3" of the scheduling matrix 600c may include the wireless device WD 3; the second-time-slot group "B3" of the scheduling matrix 600c may include the wireless device WD 4; the second-time-slot group "C3" of the scheduling matrix 600c may include the wireless device WD 7, the second-time-slot group "D3" of the scheduling matrix 600c may include the wireless device WD 8; the second-time-slot group "E3" of the scheduling matrix 600c may include the wireless device WD 11; the second-time-slot group "F3" of the scheduling matrix 600c may include the wireless device WD 12; the second-time-slot group "G3" of the scheduling matrix 600c may include the wireless device WD 15; and the second-time-slot group "H3" of the scheduling matrix 600c may include the wireless device WD 16.

To generate the scheduling matrix 600d (and consequently the time slot and frequency assignments for the fourth neighbor discovery round), the first-time-slot group "B3" (wireless device WD 2) of the scheduling matrix 600c may switch time slot and frequency assignments with the second-time-slot group "A3" (wireless device WD 3) of the scheduling matrix 600c. Further, the first-time-slot group "D3" (wireless device WD 6) of the scheduling matrix 600c may switch time slot and frequency assignments with the second-time-slot group "C3" (wireless device WD 7) of the scheduling matrix 600c. Also, the first-time-slot group "F3" (wireless device WD 10) of the scheduling matrix 600c may switch time slot and frequency assignments with the second-time-slot group "E3" (wireless device WD 11) of the scheduling matrix 600c. Further, the first-time-slot group "H3" (wireless device WD 14) of the scheduling matrix 600c may switch time slot and frequency assignments with the second-time-slot group "G3" (wireless device WD 15) of the scheduling matrix 600c. The time slot and frequency assignments of the wireless devices associated with the first-time-slot groups "A3" (wireless device WD 1), "C3" (wireless device WD 5), "E3" (wireless device WD 9), and "G3" (wireless device WD 13). Also, the time slot and frequency assignments of the wireless devices associated with the second-time-slot groups "B3" (wireless device WD 4), "D3" (wireless device WD 8), "F3" (wireless device WD 12), and "H3" (wireless device WD 16) of the scheduling matrix 600c may be the same in the scheduling matrix 600d as in the scheduling matrix 600c.

Therefore, as illustrated by the scheduling matrix 600d, in the fourth neighbor discovery round, the wireless devices WD 1, WD 3, WD 5, WD 7, WD 9, WD 11, WD 13, and WD 15 may be assigned to the first time slot ("Slot 1") and may be assigned to the frequencies "Freq. 1"-"Freq. 8," respectively. Additionally, in the fourth neighbor discovery round, the wireless devices WD 2, WD 4, WD 6, WD 8, WD 10, WD 12, WD 14, and WD 16 may be assigned to the second time slot ("Slot 2") and may be assigned to frequencies "Freq. 1"-"Freq. 8," respectively.

As mentioned above, because the time slot groups used to generate the scheduling matrix 600d may each include one of the wireless devices WD 1-WD 16, the subsequent neighbor discovery round after the fourth neighbor discovery round may be the first neighbor discovery round in which the time slot and frequency assignments may be based on the scheduling matrix 600a.

Therefore, the binary splitting scheme may be used with respect to the scheduling matrices 600a-600d (and their associated neighbor discovery rounds) such that the same wireless devices may not share the same time slots or neighbor discovery signal frequencies in every neighbor discovery round. Accordingly, the same wireless devices may not transmit the neighbor discovery signal at the same time or over the same frequencies in all the neighbor discovery rounds associated with the scheduling matrices 600a-600d.

Modifications may be made to the scheduling matrices 600a-600d without departing from the scope of the present disclosure. For example, the number of rows 604 (and accordingly number of frequencies per time slot) may vary. Additionally, in some embodiments, the rows 604a-604d may indicate time slots and the columns 602a-602d may indicate frequencies.

Additionally, in some instances the number of wireless devices to be given time slot and frequency assignments based on the binary splitting scheme may not be a power of two. In some of these instances, one or more of the elements 606a-606p may be populated with a dummy wireless device that may not exist and the binary splitting scheme may proceed as described above with the dummy wireless devices and the actual wireless devices. For example, if the number of wireless devices given time slot and frequency assignments based on the binary splitting scheme and scheduling matrices 606a-606d above is ten, six of the elements 606a-606p may be populated with dummy wireless devices while performing the binary splitting scheme.

Further, although the above description has been given with respect to dividing the wireless devices WD 1-WD 16 associated with the scheduling matrices 602a-602d into various time slot groups, the same process may be performed with respect to dividing the elements 606a-606p of the scheduling matrices 602a-602d into the various time slot groups and exchanging the resource assignments associated with the various elements 606a-606p.

As mentioned above, a scheduling matrix (e.g., scheduling matrices 300a, 300b, 400a, 400b, 500a, 500b, 600a, 600b, 600c, and 600d) may be used to assign neighbor discovery signal resources to multiple wireless devices organized in a group. In some embodiments, multiple groups of wireless devices may each be associated with one or more scheduling matrices. In these and other embodiments, the scheduling matrices associated with a particular group of wireless devices may be assigned different time slots than the scheduling matrices associated with other groups of wireless devices. Therefore, the wireless devices of one group of wireless devices may not transmit neighbor discovery signals at the same time as wireless devices of the other groups of wireless devices. Accordingly, the wireless devices may be able to discover wireless devices included in other groups.

For example, a first scheduling matrix associated with a first group of wireless devices may be assigned time slots "1" through "4" in a TDMA scheme. Therefore, the wireless devices of the first group may be configured to transmit their respective neighbor discovery signals at any one of the time slots "1" through "4". Additionally, a second scheduling matrix associated with a second group of wireless devices may be assigned time slots "5" through "8" in the same TDMA scheme. Therefore, the wireless devices of the second group may be configured to transmit their respective neighbor discovery signals at any one of the time slots "5" through "8". Accordingly, the wireless devices of the first group may not transmit their respective neighbor discovery signals at the same time that the wireless devices of the second group may transmit their respective neighbor discovery signals.

The different groups may be assigned different time slots in any number of ways and the assignment of time slots is not limited to the example given above. For example, in some embodiments, one group may be assigned even numbered time slots, while another group may be assigned odd numbered timeslots instead of the manner described above, or any other suitable assignment of time slots between groups may be performed.

Accordingly, in accordance to some embodiments described with respect to FIGS. 1-6, a wireless communication network may include one or more access points configured to direct wireless devices to perform neighbor discovery and may instruct one or more sets of wireless devices to participate in D2D communication. As described above, in some embodiments, the access points may determine the frequency and time transmission schedules for transmission and/or reception of the neighbor discovery signals by the wireless devices. Therefore, the access points may direct the wireless devices to transmit and/or listen for neighbor discovery signals at specifically assigned frequencies during specifically assigned time slots.

Figure 7:
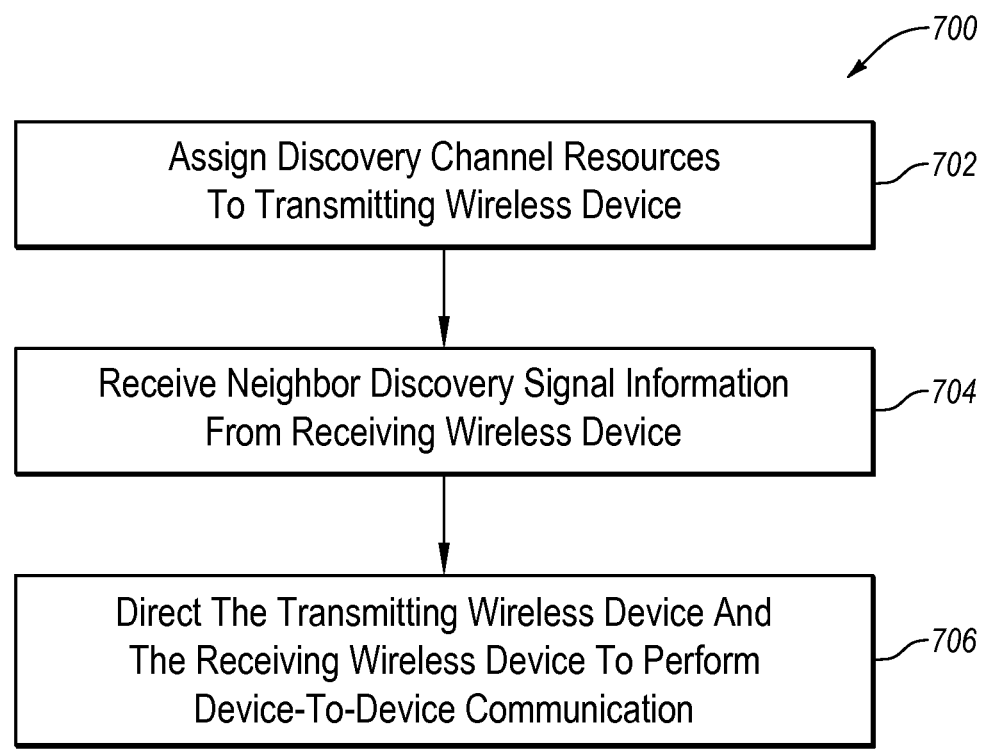
FIG. 7 is a flow chart of an example method of wireless network controlled initiation of D2D communication.

FIG. 7 is a flow chart of an example method 700 of wireless network controlled initiation of D2D communication, arranged in accordance with the present disclosure. The method 700 may be implemented, in some embodiments, by a wireless communication network, such as the network 100 described with respect to FIG. 1. For instance, the access point 102 and wireless devices 104 of the network 100 of FIG. 1 may be configured to execute computer instructions to perform one or more operations for initiating D2D communication between wireless devices 104, as represented by one or more blocks of the method 700. Although illustrated as discrete blocks, various blocks may be divided into additional blocks, combined into fewer blocks, or eliminated, depending on the desired implementation.

The method 700 may begin at block 702, where a discovery channel resource may be assigned to a transmitting wireless device. The transmitting wireless device may accordingly be configured to transmit a neighbor discovery signal based on the discovery channel resource. At block 704, neighbor discovery signal information may be received from a receiving wireless device. The receiving wireless device may be configured to receive the neighbor discovery signal transmitted by the transmitting wireless device and may determine the neighbor discovery signal information based on the neighbor discovery signal as received by the receiving wireless device. At block 706, the transmitting wireless device and the receiving wireless device may be directed to participate in D2D communication with other based on the neighbor discovery signal information.

Therefore, the method 700 may be used to effectuate wireless communication network controlled initiation of D2D communication. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 700 may further include steps associated with constructing proximity information based on the neighbor discovery signal information and directing the transmitting wireless device and the receiving wireless device to participate in D2D communication based on the proximity information. Additionally, in some embodiments, the assigning of discovery channel resources may be done based on a PNDCH and associated scheduling matrices such as described above with respect to FIGS. 2 through 6D.

Returning to FIG. 1, in some embodiments, the transmitting wireless device 104a may transmit its neighbor discovery signals over the same frequencies as, or frequencies close to, uplink and/or downlink communications between the access point 102 (or other access points) and other wireless devices 104. Therefore, as mentioned above, in some embodiments, the network 100 may be configured to control the power level of the neighbor discovery signals such that the neighbor discovery signals may not substantially interfere with other wireless communications.

In some embodiments, when the transmitting wireless device 104a is configured to transmit its associated neighbor discovery signal over frequencies associated with uplink communications, the access point 102 and/or network controller 101 may determine the power of the transmitting wireless device 104a neighbor discovery signal based on one or more of a maximum transmission power of the transmitting wireless device 104a, interference experienced by communications between the access point 102 and other wireless devices 104, an uplink signal pathloss between the wireless device 104a and the access point 102, a cell specific power control adjustment associated with the number of neighbor wireless devices discovered by the wireless devices 104 of the cell serviced by the access point 102 (e.g., the average number of neighbors discovered by each wireless device 104 performing neighbor discovery), an individual power control adjustment associated with the number of discovered neighbor wireless devices of the transmitting wireless device 104a, among other things.

For example, the transmitting wireless device 104a may not be able to transmit the neighbor discovery signal at a transmission power higher than its maximum transmission power. Therefore, the transmission power of the neighbor discovery signal may be associated with the maximum transmission power of the transmitting wireless device.

Additionally, as mentioned above, when the neighbor discovery signal is transmitted on an uplink frequency, the neighbor discovery signal may interfere with uplink signals transmitted to the access point 102 from other of the wireless devices 104. For example, the neighbor discovery signal may interfere with the uplink signals such that the neighbor discovery signal may raise the noise floor associated with the uplink signals at the access point 102.

The amount of interference experienced by the uplink signals from the neighbor discovery signal may be associated with the signal power of the neighbor discovery signal. Additionally, the amount of interference experienced by the uplink signals at the access point 102 from the neighbor discovery signal may be based on the power of the neighbor discovery signal at the access point 102. Further, the power of the neighbor discovery signal as received by the access point 102 may relate to the pathloss between the transmitting wireless device 104a and the access point 102. Therefore, in some embodiments, the pathloss between the transmitting wireless device 104a and the access point 102 may also be used as a reference power level for the neighbor discovery signal. In these and other embodiments, the power of SRS signals, physical uplink shared channel (PUSCH) signals and/or physical uplink PUCCH signals transmitted by the transmitting wireless device 104a for reception by the access point 102 may be used as reference power levels.

In some embodiments, the pathloss, SRS signal power, PUSCH signal power, and/or PUCCH signal power may each be applied with a weighting factor based on the amount of interference experienced by the uplink communications communicated to the access point 102 such that the amount of the pathloss, SRS signal power, PUSCH signal power, and/or PUCCH signal power used as the reference power level may be adjusted based on the interference. In some embodiments, the weighting factor may be a number between "0" and "1" that may be determined by the network control unit 101 and communicated to the access point 102 by the network control unit 101.

The network control unit 101 may determine the weighting factor based on interference that may be from the neighbor discovery signal, environmental factors, and/or other wireless signals (including other neighbor discovery signals). When the uplink communications to the access point 102 experience a relatively high amount of interference (from the neighbor discovery signal and/or other factors) the network control unit 101 may set the weighting factor to be lower than when the uplink communications to the access point 102 experience a relatively low amount of interference. Additionally, in some embodiments, the network control unit 101 may set the weighting factor based on the interference experienced by uplink communications intended for other access points in instances when the neighbor discovery signal transmitted by the transmitting wireless device 104a may also interfere with the uplink communications intended for the other access points.

Further, as mentioned above, the access point 102 may adjust the transmission power of the neighbor discovery signal based on a power control adjustment associated with the number of neighbor wireless devices discovered by the transmitting wireless devices serviced by the access point 102 (e.g., the average number of neighbors discovered by each wireless device 104 performing neighbor discovery by transmitting a neighbor discovery signal). When a transmitting wireless device, such as the transmitting wireless device 104a, transmits a neighbor discovery signal, the number of wireless devices that may receive the neighbor discovery signal (and thus may be discovered neighbors of the wireless device transmitting the neighbor discovery signal) may be based on the transmission power of the neighbor discovery signal. Therefore, the access point 102 may direct the transmitting wireless devices to adjust the transmission power of their respective neighbor discovery signals such that the number of neighbor wireless devices discovered by at least a majority of the transmitting wireless devices may be within a desired range (e.g., between 6 and 10). In some embodiments, the access point 102 may make this determination based on the average number of neighbor wireless devices discovered by each wireless device transmitting a neighbor discovery signal.

The access point 102 may also adjust the transmission power of the transmitting wireless device 104a based on the number of neighbors individually discovered by the transmitting wireless device 104a. Therefore, the access point 102 may also make individual power adjustments for the transmitting wireless device 104a such that the number of neighbor wireless devices discovered by the transmitting wireless device 104a may be within the desired range.

In some embodiments the access point 102 may determine the neighbor discovery signal power based on one or more of the following expressions:

$$P_{NDS} = \min(P_{max}, \alpha \cdot PL_C + \Delta P_C + \Delta P_{WD});$$

$$P_{NDS} = \min(P_{max}, \alpha \cdot P_{SRS} + \Delta P_C + \Delta P_{WD});$$

$$P_{NDS} = \min(P_{max}, \alpha \cdot P_{PUSCH} + \Delta P_C + \Delta P_{WD}); \text{ and}$$

$$P_{NDS} = \min(P_{max}, \alpha \cdot PL_{PUCCH} + \Delta P_C + \Delta P_{WD})$$

In the above expressions: "$P_{NDS}$" may represent the determined power of the neighbor discovery signal transmitted by the transmitting wireless device 104a; "$P_{max}$" may represent the maximum transmission power of the transmitting wireless device 104a; "a" may represent the weighting factor associated with the interference experienced by uplink communications; "$PL_C$" may represent the pathloss between the transmitting wireless device 104a and the access point 102; "$P_{SRS}$" may represent the SRS signal power of an SRS signal transmitted between the transmitting wireless device 104a and the access point 102; "$P_{PUSCH}$" may represent the PUSCH signal power of a PUSCH signal transmitted between the transmitting wireless device 104a and the access point 102; "$P_{PUCCH}$" may represent the PUCCH signal power of a PUCCH signal transmitted between the transmitting wireless device 104a and the access point 102; "$\Delta P_C$" may represent the cell specific power control adjustment described above; and "$\Delta P_{WD}$" may represent the individual power control adjustment associated with the transmitting wireless device 104a, also described above.

Accordingly, in the first expression, the transmission power of the neighbor discovery signal of the transmitting wireless device 104a may be the lower value of the maximum transmission power of the transmitting wireless device 104a or the sum of the pathloss multiplied by the weighting factor, the cell specific power adjustment and the individual power adjustment for the transmitting wireless device 104a. In the second expression, the transmission power of the neighbor discovery signal of the transmitting wireless device 104 may be the lower value of the maximum transmission power of the transmitting wireless device 104a or the sum of the SRS signal power multiplied by the weighting factor, the cell specific power adjustment, and the individual power adjustment for the transmitting wireless device 104a. In the third expression, the transmission power of the neighbor discovery signal of the transmitting wireless device 104a may be the lower value of the maximum transmission power of the transmitting wireless device 104a or the sum of the SRS signal power multiplied by the weighting factor, the cell specific power adjustment, and the individual power adjustment for the transmitting wireless device 104a.

Accordingly, the above expressions may be used by the access point 102 to set the transmission power level of the neighbor discovery signal of the transmitting wireless device 104a when the transmitting wireless device 104a is configured to transmit the neighbor discovery signal over one or more frequencies associated with uplink communications. When the transmitting wireless device 104a is configured to transmit the neighbor discovery signal over one or more frequencies associated with downlink communications, the access point 102 may determine the transmission power of the neighbor discovery signal in a slightly different manner, as described below.

When the transmitting wireless device 104a is configured to transmit the neighbor discovery signal over a downlink frequency, information associated with the interference experienced by downlink communications between the access point 102 (or other access points) and other wireless devices 104 may not be readily available. Accordingly, in these embodiments, the power of the neighbor discovery signal may be based on the maximum transmission power of the transmitting wireless device 104a and may also be based on a cell specific transmission power associated with an estimated number of neighbor wireless devices that may be discovered by each of the transmitting wireless devices within the cell serviced by the access point 102 when their neighbor discovery signals are at the cell specific transmission power. Additionally, the power of the neighbor discovery signal when the neighbor discovery signal is transmitted over a downlink frequency may be based on an individual power adjustment of the transmitting wireless device 104a associated with the number of neighbor wireless devices that may be discovered by the transmitting wireless device 104a with its associated neighbor discovery signal.

In these and other embodiments, the access point 102 may determine the neighbor discovery signal power based on the following expression:

$$P_{NDS} = \min(P_{max}, P_C + \Delta P_{WD})$$

In the above expression: "$P_{NDS}$" may represent the determined power of the neighbor discovery signal transmitted by the transmitting wireless device 104a; "$P_{max}$" may represent the maximum transmission power of the transmitting wireless device 104a; "$P_C$" may represent the cell specific power level described above; and "$\Delta P_{WD}$" may represent the individual power control adjustment associated with the transmitting wireless device 104a, also described above. As indicated by the expression, the transmission power of the neighbor discovery signal of the transmitting wireless device 104a may be the lower value of the maximum transmission power of the transmitting wireless device 104a or the sum of the cell specific power level and the individual power adjustment for the transmitting wireless device 104a. Accordingly, the above expressions may be used by the access point 102 to set the transmission power level of the neighbor discovery signal of the transmitting wireless device 104a when the transmitting wireless device 104a is configured to transmit the neighbor discovery signal over one or more frequencies associated with downlink communications.

Therefore, the access point 102 may determine the transmission power of the neighbor discovery signal in a manner as described above. After determining the transmission power of the neighbor discovery signal, the access point 102 may instruct the transmitting wireless device 104a to transmit its neighbor discovery signal at the determined transmission power. In some embodiments, the access point 102 may instruct the transmitting wireless device 104a based on an RRC configuration.

Modifications may be made to the power control described above. For example, the access point 102 and/or transmitting wireless device 104a may determine one or more parameters associated with determining and setting the power of the neighbor discovery signal. Further, any number of wireless devices 104 may be configured as transmitting wireless devices and the power level of each neighbor discovery signal associated with each transmitting wireless device may be adjusted in a manner as described above. Additionally, one or more of the factors described above may be used to adjust the power of a neighbor discovery signal even if the neighbor discovery signal is not transmitted on uplink or downlink frequencies.

Figure 8:
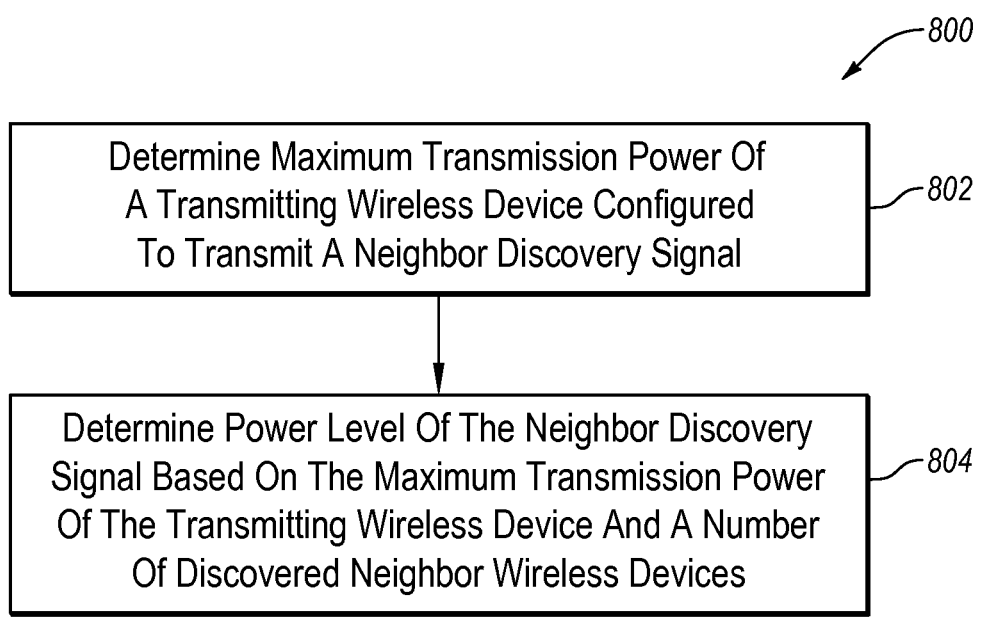
FIG. 8 is a flow chart of an example method of power control of a neighbor discovery signal.

FIG. 8 is a flow chart of an example method 800 of power control of a neighbor discovery signal, arranged in accordance with the present disclosure. The method 800 may be implemented, in some embodiments, by a wireless communication network, such as the network 100 described with respect to FIG. 1. For instance, the access point 102, the network control unit 101, and/or the wireless devices 104 of the network 100 of FIG. 1 may be configured to execute computer instructions to perform one or more operations for controlling the power level of a neighbor discovery signal, as represented by one or more blocks of the method 800. Although illustrated as discrete blocks, various blocks may be divided into additional blocks, combined into fewer blocks, or eliminated, depending on the desired implementation.

The method 800 may begin at block 802, where a maximum transmission power of a transmitting wireless device may be determined. The transmitting wireless device may be configured to transmit a neighbor discovery signal to one or more receiving wireless devices. Therefore, the one or more receiving wireless devices may be discovered neighbor wireless devices of the transmitting wireless device.

At block 804, a power level of the neighbor discovery signal may be determined. The power level of the neighbor discovery signal may be determined based on the maximum transmission power of the transmitting wireless device and a number of the discovered neighbor wireless devices.

Therefore, the method 800 may be used to determine a power level of a neighbor discovery signal. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, in some embodiments, the method 800 may further include steps associated with determining the neighbor discovery signal power based on at least one of a power level of a PUSCH signal transmitted between the transmitting wireless device and a wireless network access point, a power level of a PUCCH signal transmitted between the transmitting wireless device and the wireless network access point, a power level of an SRS signal transmitted between the transmitting wireless device and the wireless network access point, and an uplink signal pathloss between the transmitting wireless device and the wireless network access point. Further, in these and other embodiments, the method 800 may further include steps associated with determining the neighbor discovery signal power level based on a number of neighboring wireless devices discovered by another transmitting wireless device. Also, the method 800 may include steps associated with determining the neighbor discovery signal power level based on interference experienced by communications between another wireless device and an access point of the wireless communication network.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   determining a maximum transmission power of a transmitting wireless device configured to transmit a neighbor discovery signal configured to be received by one or more receiving wireless devices that are configured to receive the neighbor discovery signal;
   obtaining a number of previous neighbor wireless devices previously discovered by another transmitting wireless device, the previous neighbor wireless devices being discovered through reception, by the previous neighbor wireless devices, of a previous neighbor discovery signal transmitted by the other transmitting wireless device;
   determining, based on the number of previous neighbor wireless devices, a target number of receiving wireless devices that are discoverable neighbor wireless devices of the transmitting wireless device, the target number including a range of numbers;
   determining a power level of the neighbor discovery signal based on the maximum transmission power of the transmitting wireless device and based on the power level being such that the neighbor discovery signal is received by the target number of receiving wireless devices; and
   directing the transmitting wireless device to transmit the neighbor discovery signal at the determined power level.

2. The method of claim 1, further comprising determining the power level of the neighbor discovery signal based on interference experienced by a communication between another wireless device and a wireless network access point.

3. The method of claim 1, further comprising determining the power level of the neighbor discovery signal based on at least one of a Physical Uplink Shared Channel (PUSCH) power level of a PUSCH signal transmitted between the transmitting wireless device and a wireless network access point, a Physical Uplink Control Channel (PUCCH) power level of a PUCCH signal transmitted between the transmitting wireless device and the wireless network access point, a Sounding Reference Signal (SRS) power level of an SRS signal transmitted between the transmitting wireless device and the wireless network access point, and an uplink signal pathloss between the transmitting wireless device and the wireless network access point.

4. The method of claim 3, further comprising using at least one of the PUSCH power level, the PUCCH power level, the SRS power level, and the uplink signal pathloss as a reference power level for the neighbor discovery signal.

5. The method of claim 4, further comprising applying a weighting factor to at least one of the PUSCH power level, the PUCCH power level, the SRS power level, and the uplink signal pathloss to determine the reference power level, the weighting factor based on interference experienced by an uplink communication between another wireless device and at least one of the wireless network access point and another wireless network access point.

6. The method of claim 1, further comprising communicating the power level of the neighbor discovery signal based on a radio resource control (RRC) configuration.

7. A processor configured to execute computer instructions to cause a system to perform operations, the operations comprising:
   determining a maximum transmission power of a transmitting wireless device configured to transmit a neighbor discovery signal configured to be received by one or more receiving wireless devices that are configured to receive the neighbor discovery signal;

obtaining a number of previous neighbor wireless devices previously discovered by another transmitting wireless device, the previous neighbor wireless devices being discovered through reception, by the previous neighbor wireless devices, of a previous neighbor discovery signal transmitted by the other transmitting wireless device;

determining, based on the number of previous neighbor wireless devices, a target number of receiving wireless devices that are discoverable neighbor wireless devices of the transmitting wireless device, the target number including a range of numbers; and determining a power level of the neighbor discovery signal based on the maximum transmission power of the transmitting wireless device and based on the power level being such that the neighbor discovery signal is received by the target number of receiving wireless devices.

8. The processor of claim 7, wherein the operations further comprise determining the power level of the neighbor discovery signal based on interference experienced by a communication between another wireless device and a wireless network access point.

9. The processor of claim 7, wherein the operations further comprise determining the power level of the neighbor discovery signal based on at least one of a Physical Uplink Shared Channel (PUSCH) power level of a PUSCH signal transmitted between the transmitting wireless device and a wireless network access point, a Physical Uplink Control Channel (PUCCH) power level of a PUCCH signal transmitted between the transmitting wireless device and the wireless network access point, a Sounding Reference Signal (SRS) power level of an SRS signal transmitted between the transmitting wireless device and the wireless network access point, and an uplink signal pathloss between the transmitting wireless device and the wireless network access point.

10. The processor of claim 9, wherein the operations further comprise using at least one of the PUSCH power level, the PUCCH power level, the SRS power level, and the uplink signal pathloss as a reference power level for the neighbor discovery signal.

11. The processor of claim 10, wherein the operations further comprise applying a weighting factor to at least one of the PUSCH power level, the PUCCH power level, the SRS power level, and the uplink signal pathloss to determine the reference power level, the weighting factor based on interference experienced by an uplink communication between another wireless device and at least one of the wireless network access point and another wireless network access point.

12. A method of transmitting a neighbor discovery signal, the method comprising:

receiving, by a transmitting wireless device, a power level of a neighbor discovery signal configured to be received by one or more receiving wireless devices that are configured to receive the neighbor discovery signal, the transmitting wireless device being configured to transmit the neighbor discovery signal, and the power level of the neighbor discovery signal being determined by:

obtaining a number of previous neighbor wireless devices previously discovered by another transmitting wireless device, the previous neighbor wireless devices being discovered through reception, by the previous neighbor wireless devices, of a previous neighbor discovery signal transmitted by the other transmitting wireless device;

determining, based on the number of previous neighbor wireless devices, a target number of receiving wireless devices that are discoverable neighbor wireless devices of the transmitting wireless device, the target number including a range of numbers; and determining the power level of the neighbor discovery signal based on a maximum transmission power of the transmitting wireless device and based on the power level being such that the neighbor discovery signal is received by the target number of receiving wireless devices.

13. The method of claim 12, wherein the power level of the neighbor discovery signal is further based on interference experienced by a communication between another wireless device and a wireless network access point.

14. The method of claim 12, wherein the power level of the neighbor discovery signal is further based on at least one of a Physical Uplink Shared Channel (PUSCH) power level of a PUSCH signal transmitted between the transmitting wireless device and a wireless network access point, a Physical Uplink Control Channel (PUCCH) power level of a PUCCH signal transmitted between the transmitting wireless device and the wireless network access point, a Sounding Reference Signal (SRS) power level of an SRS signal transmitted between the transmitting wireless device and the wireless network access point, and an uplink signal pathloss between the transmitting wireless device and the wireless network access point.

15. The method of claim 14, wherein at least one of the PUSCH power level, the PUCCH power level, the SRS power level, and the uplink signal pathloss is used as a reference power level for the neighbor discovery signal.

16. The method of claim 15, wherein a weighting factor is applied to at least one of the PUSCH power level, the PUCCH power level, the SRS power level, and the uplink signal pathloss to determine the reference power level, the weighting factor based on interference experienced by an uplink communication between another wireless device and at least one of the wireless network access point and another wireless network access point.

17. The method of claim 12, further comprising receiving the power level of the neighbor discovery signal based on a radio resource control (RRC) configuration.

* * * * *